(12) United States Patent
Hamasaka et al.

(10) Patent No.: US 8,068,718 B2
(45) Date of Patent: Nov. 29, 2011

(54) REPRODUCTION DEVICE, SYSTEM INTEGRATION CIRCUIT, PROGRAM, REPRODUCTION METHOD, AND INFORMATION RECORDING MEDIUM

(75) Inventors: Hiroshi Hamasaka, Osaka (JP); Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 1484 days.

(21) Appl. No.: 10/568,045

(22) PCT Filed: Sep. 2, 2004

(86) PCT No.: PCT/JP2004/013085
§ 371 (c)(1),
(2), (4) Date: Sep. 6, 2006

(87) PCT Pub. No.: WO2005/024828
PCT Pub. Date: Mar. 17, 2005

(65) Prior Publication Data
US 2007/0003220 A1    Jan. 4, 2007

(30) Foreign Application Priority Data
Sep. 2, 2003    (JP) ................ 2003-309793

(51) Int. Cl.
*G11B 27/00*    (2006.01)
(52) U.S. Cl. .................................................. 386/278
(58) Field of Classification Search .................. None
See application file for complete search history.

(56) References Cited

U.S. PATENT DOCUMENTS

| | | | |
|---|---|---|---|
| 5,884,004 A | 3/1999 | Sato et al. | |
| 6,553,179 B1 | 4/2003 | Miwa et al. | |
| 6,580,870 B1 * | 6/2003 | Kanazawa et al. | 386/240 |
| 2001/0030827 A1 | 10/2001 | Morohashi | |

FOREIGN PATENT DOCUMENTS

| | | |
|---|---|---|
| JP | 05-258531 | 10/1993 |
| JP | 06-309120 | 11/1994 |
| JP | 2856363 | 11/1998 |
| JP | 11-238367 | 8/1999 |
| JP | 2000-175145 | 6/2000 |
| JP | 2001-021212 | 1/2001 |
| JP | 2001-216766 | 8/2001 |
| JP | 3375618 | 11/2002 |

* cited by examiner

*Primary Examiner* — William Vaughn, Jr.
*Assistant Examiner* — Daniel Tekle

(57) ABSTRACT

A playback apparatus that plays back a plurality of AV Clips recorded on a BD-ROM. The playback apparatus judges whether there is a playback control that becomes enabled or disabled when a current playback point of the digital stream reaches a predetermined point in a playback timeline. When there is a playback control that becomes enabled or disabled, information indicating the enabled or disabled playback control is transmitted to a touch panel remote control 200 and have the operation device display the enabled or disabled playback control on a chapter of the touch panel remote control 200.

13 Claims, 32 Drawing Sheets

FIG.11A

TEMPLATE FOR BUTTON
INFORMATION

BUTTONxxx : yyy
NAME="aaa"
IMAGE="bbb"
POSITION="ccc"
EVENT="ddd"

FIG.11B

TEMPLATE FOR TEXT
INFORMATION

TEXTeee : fff
NAME="ggg"
POSITION="hhh"

FIG.12A
BUTTON INFORMATION 1

BUTTON 1: ENABLED
NAME=" MENU"
IMAGE=" STAR"
POSITION=" UPPER LEFT"
EVENT=" DISPLAY MENU"

FIG.12B
TEXT INFORMATION

TEXT 1: NORMAL
NAME=" ANGLE SELECTION"
POSITION=" UPPER CENTER"

FIG.12C
BUTTON INFORMATION 2

BUTTON 2: ENABLED
NAME=" 1"
IMAGE=" OVAL"
POSITION=" MIDDLE LEFT"
EVENT=" ANGLE 1"

FIG.12D
BUTTON INFORMATION 3

BUTTON 3: ENABLED
NAME=" 2"
IMAGE=" OVAL"
POSITION=" MIDDLE RIGHT"
EVENT=" ANGLE 2"

FIG.12E
BUTTON INFORMATION 4

BUTTON 4: ENABLED
NAME=" PREVIOUS"
IMAGE=" LEFT ARROW"
POSITION=" MIDDLE LOWER LEFT"
EVENT=" SKIP BACK"

FIG.12F
BUTTON INFORMATION 5

BUTTON 5: ENABLED
NAME=" NEXT"
IMAGE=" RIGHT ARROW"
POSITION=" MIDDLE LOWER RIGHT"
EVENT=" SKIP NEXT"

FIG.12G
BUTTON INFORMATION 6

BUTTON 6: ENABLED
NAME=" FAST-REWIND"
IMAGE=" PENTAGONAL
    FIGURE POINTING LEFT"
POSITION=" LOWER LEFT"
EVENT=" FAST-REWIND"

FIG.12H
BUTTON INFORMATION 7

BUTTON 7: ENABLED
NAME=" FAST-FORWARD"
IMAGE=" PENTAGONAL
    FIGURE POINTING RIGHT"
POSITION=" LOWER RIGHT"
EVENT=" FAST-FORWARD"

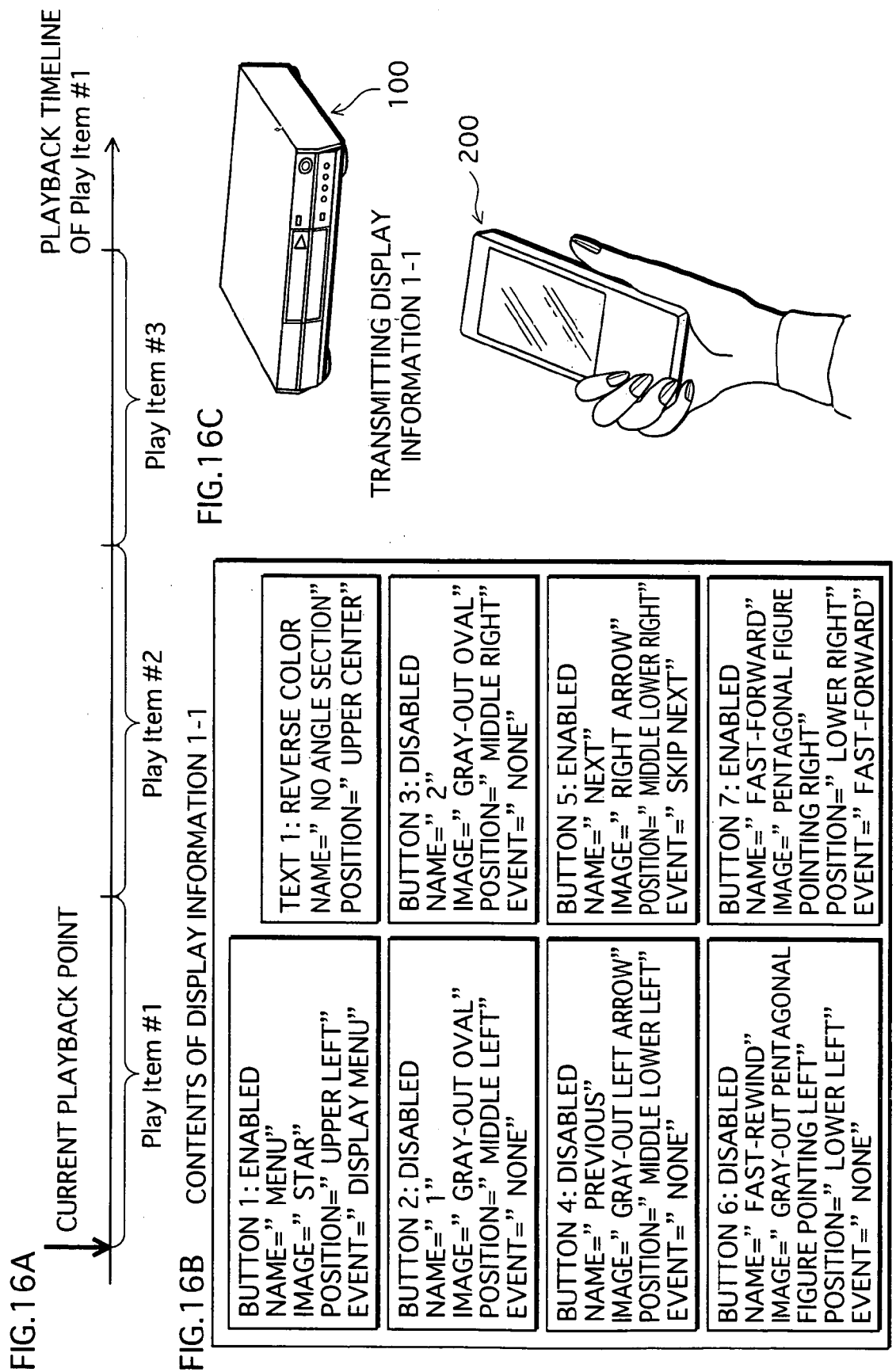

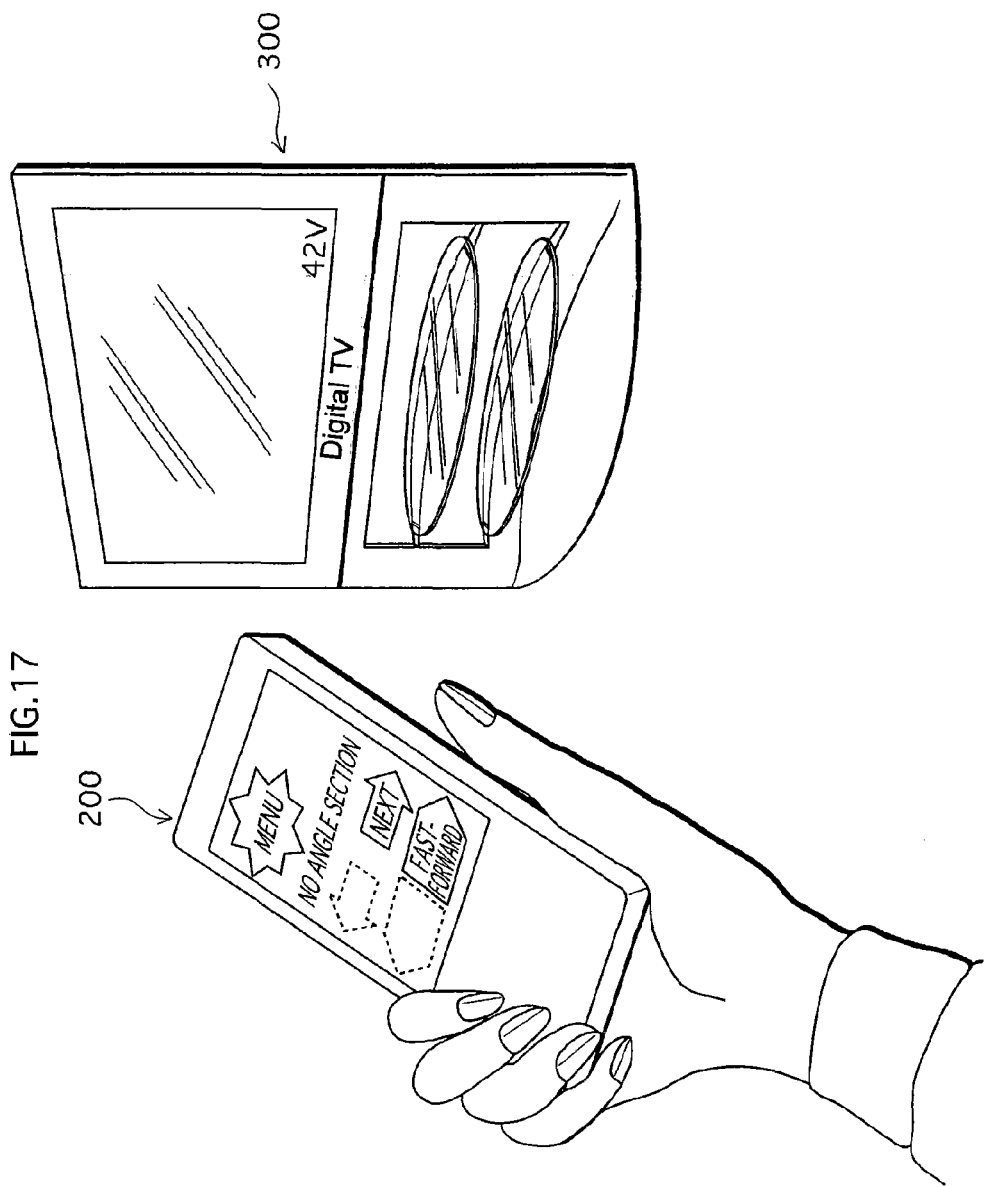

FIG. 18A

PLAYBACK TIMELINE OF Play Item #1

CURRENT PLAYBACK POINT

Play Item #1 | Play Item #2 | Play Item #3

FIG. 18C

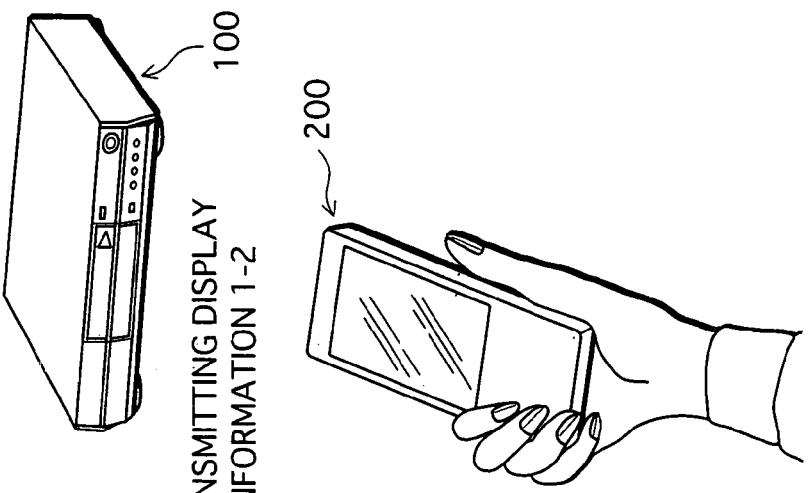

TRANSMITTING DISPLAY INFORMATION 1-2

FIG. 18B  CONTENTS OF DISPLAY INFORMATION 1-2

BUTTON 1: ENABLED
NAME=" MENU"
IMAGE=" STAR"
POSITION=" UPPER LEFT"
EVENT=" DISPLAY MENU"

TEXT 1: NORMAL COLOR
NAME=" ANGLE SELECTION"
POSITION=" UPPER CENTER"

BUTTON 2: ENABLED
NAME=" 1"
IMAGE=" OVAL"
POSITION=" MIDDLE LEFT"
EVENT=" ANGLE 1"

BUTTON 3: ENABLED
NAME=" 2"
IMAGE=" OVAL"
POSITION=" MIDDLE RIGHT"
EVENT=" ANGLE 2"

BUTTON 4: ENABLED
NAME=" PREVIOUS"
IMAGE=" LEFT ARROW"
POSITION=" MIDDLE LOWER LEFT"
EVENT=" SKIP BACK"

BUTTON 5: ENABLED
NAME=" NEXT"
IMAGE=" RIGHT ARROW"
POSITION=" MIDDLE LOWER RIGHT"
EVENT=" SKIP NEXT"

BUTTON 6: ENABLED
NAME=" FAST-REWIND"
IMAGE=" PENTAGONAL FIGURE POINTING LEFT"
POSITION=" LOWER LEFT"
EVENT=" FAST-REWIND"

BUTTON 7: ENABLED
NAME=" FAST-FORWARD"
IMAGE=" PENTAGONAL FIGURE POINTING RIGHT"
POSITION=" LOWER RIGHT"
EVENT=" FAST-FORWARD"

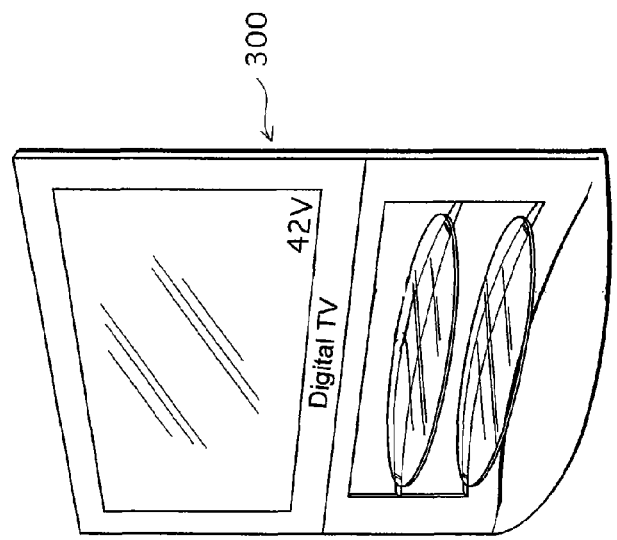
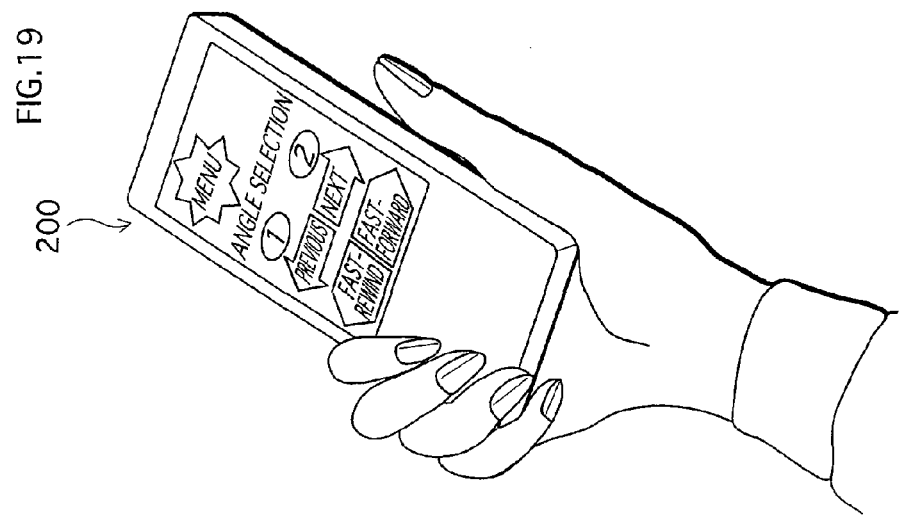
FIG.19

FIG.20A

PLAYBACK TIMELINE OF Play Item #1 →

CURRENT PLAYBACK POINT

Play Item #1 | Play Item #2 | Play Item #3

FIG.20B  CONTENTS OF DISPLAY INFORMATION 1-3

BUTTON 1: ENABLED
NAME="MENU"
IMAGE="STAR"
POSITION="UPPER LEFT"
EVENT="DISPLAY MENU"

TEXT 1: REVERSE COLOR
NAME="NO ANGLE SECTION"
POSITION="UPPER CENTER"

BUTTON 2: DISABLED
NAME="1"
IMAGE="GRAY-OUT OVAL"
POSITION="MIDDLE LEFT"
EVENT="NONE"

BUTTON 3: DISABLED
NAME="2"
IMAGE="GRAY-OUT OVAL"
POSITION="MIDDLE RIGHT"
EVENT="NONE"

BUTTON 4: ENABLED
NAME="PREVIOUS"
IMAGE="LEFT ARROW"
POSITION="MIDDLE LOWER LEFT"
EVENT="SKIP BACK"

BUTTON 5: DISABLED
NAME="NEXT"
IMAGE="GRAY-OUT RIGHT ARROW"
POSITION="MIDDLE LOWER RIGHT"
EVENT="NONE"

BUTTON 6: ENABLED
NAME="FAST-REWIND"
IMAGE="PENTAGONAL FIGURE POINTING LEFT"
POSITION="LOWER LEFT"
EVENT="FAST-REWIND"

BUTTON 7: DISABLED
NAME="FAST-FORWARD"
IMAGE="GRAY-OUT PENTAGONAL FIGURE POINTING RIGHT"
POSITION="LOWER RIGHT"
EVENT="NONE"

FIG.20C

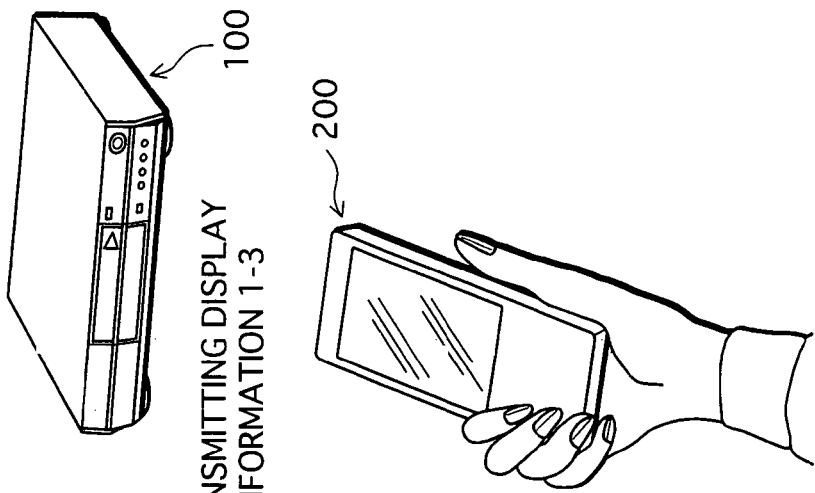

TRANSMITTING DISPLAY INFORMATION 1-3

100

200

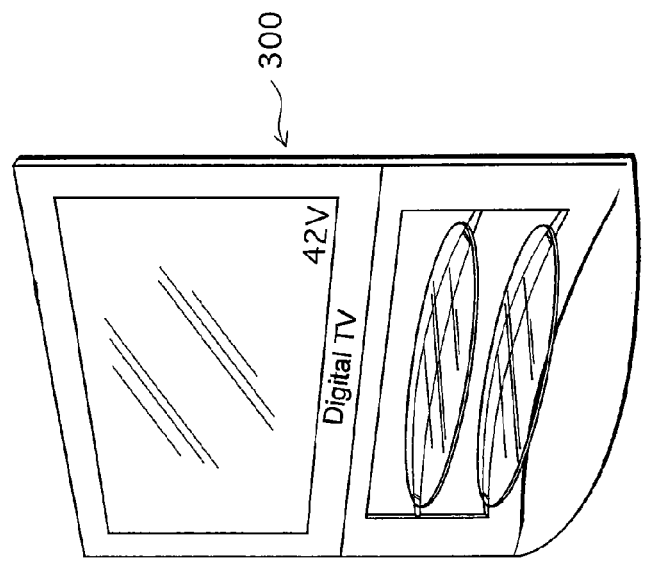
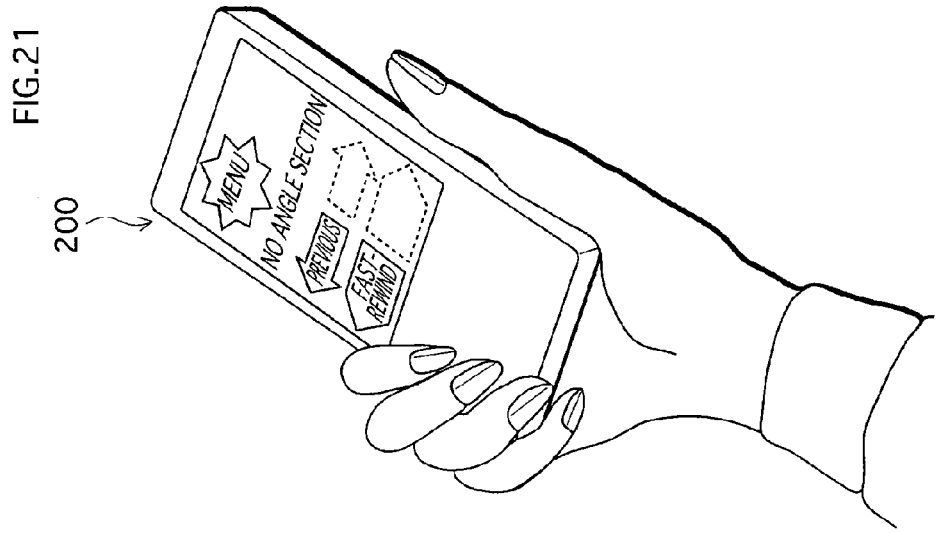

FIG.28

Remote 1.dat

EFFECTIVE SECTION=Play Item # 1

BUTTON 1: ENABLED
NAME=" MENU"
IMAGE=" STAR"
POSITION=" UPPER LEFT"
EVENT=" DISPLAY MENU"

TEXT 1: REVERSE COLOR
NAME=" NO ANGLE SECTION"
POSITION=" UPPER CENTER"

BUTTON 2: DISABLED
NAME=" 1"
IMAGE=" GRAY-OUT OVAL"
POSITION=" MIDDLE LEFT"
EVENT=" NONE"

BUTTON 3: DISABLED
NAME=" 2"
IMAGE=" GRAY-OUT OVAL"
POSITION=" MIDDLE RIGHT"
EVENT=" NONE"

BUTTON 4: DISABLED
NAME=" PREVIOUS"
IMAGE=" GRAY-OUT LEFT ARROW"
POSITION=" MIDDLE LOWER LEFT"
EVENT=" NONE"

BUTTON 5: ENABLED
NAME=" NEXT"
IMAGE=" RIGHT ARROW"
POSITION=" MIDDLE LOWER RIGHT"
EVENT=" SKIP NEXT"

BUTTON 6: DISABLED
NAME=" FAST-REWIND"
IMAGE=" GRAY-OUT PENTAGONAL FIGURE POINTING LEFT"
POSITION=" LOWER LEFT"
EVENT=" NONE"

BUTTON 7: ENABLED
NAME=" FAST-FORWARD"
IMAGE=" PENTAGONAL FIGURE POINTING RIGHT"
POSITION=" LOWER RIGHT"
EVENT=" FAST-FORWARD"

FIG.29

Remote 2.dat

EFFECTIVE SECTION=Play Item # 2

BUTTON 1: ENABLED
NAME=" MENU"
IMAGE=" STAR"
POSITION=" UPPER LEFT"
EVENT=" DISPLAY MENU"

TEXT 1: NORMAL COLOR
NAME=" ANGLE SELECTION"
POSITION=" UPPER CENTER"

BUTTON 2: ENABLED
NAME=" 1"
IMAGE=" OVAL"
POSITION=" MIDDLE LEFT"
EVENT=" ANGLE 1"

BUTTON 3: ENABLED
NAME=" 2"
IMAGE=" OVAL"
POSITION=" MIDDLE RIGHT"
EVENT=" ANGLE 2"

BUTTON 4: ENABLED
NAME=" PREVIOUS"
IMAGE=" LEFT ARROW"
POSITION=" MIDDLE LOWER LEFT"
EVENT=" SKIP BACK"

BUTTON 5: ENABLED
NAME=" NEXT"
IMAGE=" RIGHT ARROW"
POSITION=" MIDDLE LOWER RIGHT"
EVENT=" SKIP NEXT"

BUTTON 6: ENABLED
NAME=" FAST-REWIND"
IMAGE=" PENTAGONAL FIGURE POINTING LEFT"
POSITION=" LOWER LEFT"
EVENT=" FAST-REWIND"

BUTTON 7: ENABLED
NAME=" FAST-FORWARD"
IMAGE=" PENTAGONAL FIGURE POINTING RIGHT"
POSITION=" LOWER RIGHT"
EVENT=" FAST-FORWARD"

FIG.30

Remote 3.dat

EFFECTIVE SECTION=Play Item # 3

BUTTON 1: ENABLED
NAME=" MENU"
IMAGE=" STAR"
POSITION=" UPPER LEFT"
EVENT=" DISPLAY MENU"

TEXT 1: REVERSE COLOR
NAME=" NO ANGLE SECTION"
POSITION=" UPPER CENTER"

BUTTON 2: DISABLED
NAME=" 1"
IMAGE=" GRAY-OUT OVAL"
POSITION=" MIDDLE LEFT"
EVENT=" NONE"

BUTTON 3: DISABLED
NAME=" 2"
IMAGE=" GRAY-OUT OVAL"
POSITION=" MIDDLE RIGHT"
EVENT=" NONE"

BUTTON 4: ENABLED
NAME=" PREVIOUS"
IMAGE=" LEFT ARROW"
POSITION=" MIDDLE LOWER LEFT"
EVENT=" SKIP BACK"

BUTTON 5: DISABLED
NAME=" NEXT"
IMAGE=" GRAY-OUT RIGHT ARROW"
POSITION=" MIDDLE LOWER RIGHT"
EVENT=" NONE"

BUTTON 6: ENABLED
NAME=" FAST-REWIND"
IMAGE=" PENTAGONAL
         FIGURE POINTING LEFT"
POSITION=" LOWER LEFT"
EVENT=" FAST-REWIND"

BUTTON 7: DISABLED
NAME=" FAST-FORWARD"
IMAGE=" GRAY-OUT PENTAGONAL
         FIGURE POINTING RIGHT"
POSITION=" LOWER RIGHT"
EVENT=" NONE"

FIG.32

UO mask table

| chapter_search_mask |
| --- |
| time_search_mask |
| skip_next_mask |
| skip_back_mask |
| play_mask |
| stop_mask |
| pause_on_mask |
| pause_off_mask |
| still_off_mask |
| forward_play_mask |
| backward_play_mask |
| resume_mask |
| move_up_selected_button_mask |
| move_down_selected_button_mask |
| move_left_selected_button_mask |
| move_right_selected_button_mask |
| select_button_mask |
| acivate_and_activate_mask |
| select_and_activate_mask |
| audio_change_mask |
| PG_textST_change_mask |
| angle_change_mask |
| pupup_on_mask |
| pupup_off_mask |
| select_menu_language_mask |

REPRODUCTION DEVICE, SYSTEM INTEGRATION CIRCUIT, PROGRAM, REPRODUCTION METHOD, AND INFORMATION RECORDING MEDIUM

TECHNICAL FIELD

The present invention relates to a technique for controlling playback of digital streams, and more specifically, it relates to application of such a technique to commercially produced playback apparatuses, system integrated circuits to be incorporated in the playback apparatuses, computer executable programs, and information recording media.

BACKGROUND ART

Well-known playback controls that can be used in commercially produced playback apparatuses include fast-forward, fast-rewind, chapter skip, pause (temporary suspension), angle change, audio change, and menu call. Playback controls are expected to increasingly diversify as new package media in a new data format such as DVD-Videos and BD-ROMs appear on the market.

Whether a specific playback control is enabled or disabled depends on where the current playback point is in a playback timeline of the digital stream. In order to perform a playback control such as "angle change", multiple pieces of video data recorded in a specific data structure must be present. In other words, the angle change cannot be executed unless the current playback point reaches a point at which such a specific data structure exists. The angle change becomes available only when the current playback point reaches the point at which the specific structure exists.

Conventionally, however, there has been no way of informing a user that such a point has been reached, which means the user often misses the chance to instruct the playback apparatus to perform a playback control, or waste time for trying to instruct the playback apparatus to perform a disabled playback control without realizing that a playback control is unavailable.

One solution to inform the user of the availability of playback controls at the current playback point is to display navigators in a display screen. Navigators are GUIs that aid the user's thinking and decision making by displaying available operations and parameters, and are often seen in video games and such. The problem of the user missing the chance for the playback controls is thought to be avoided by displaying navigators on the screen to inform the user of the enabled playback controls at the current playback point. However, the display of navigators has caused persistent objections from producers who engage in movie production. Movie producers create each scene of a movie work based on their own artistic sensitivity. Producers take offense if navigators are merged in scenes of their movie works, because this represents a kind of alteration to the movie work.

DISCLOSURE OF THE INVENTION

An object of the present invention is to provide a playback apparatus capable of informing a user of availability of a playback control that is enabled at a current playback point, without disturbing a scene of a playback image.

In order to achieve the above object, the playback apparatus according to the present invention comprises a playback unit operable to play back a digital stream recorded on a recording medium; a judging unit operable to judge whether there is a playback control that becomes enabled or disabled, when a current playback point in a playback timeline of the digital stream reaches a predetermined point; and a transmission unit operable to, when a result of the judging is affirmative, transmit information relating to the playback control to an operation device, wherein whether the playback control is enabled or disabled is displayed on the operation device in accordance with the transmitted information.

According to the above playback apparatus, the information indicating which playback control becomes enabled or disabled at the current playback point is transmitted to the operation device when the current playback point reaches the predetermined point, and thus an image indicating the enabled or disabled playback control is displayed on the operation device. By checking the display on the operation device while watching and listening to a main body of the digital stream, the user is able to know which operation is available at the current playback point. By knowing the availability of a playback control, the user may not miss a chance to perform the playback control. The information indicating the enabled and disabled playback controls are shown on a display of the operation device separate from the playback image of the digital stream, and therefore the display of the information does not disturb a scene from the digital stream.

BRIEF DESCRIPTION OF THE DRAWINGS

FIG. 11A illustrates an example of definition information that defines a button.

FIG. 11B illustrates an example of definition information that defines a text.

FIGS. 12A to 12H are examples of display information indicating availability of seven playback controls including menu call, changing to angle 1, changing to angle 2, skip back, skip next, fast-forward, and fast-rewind.

FIGS. 16A, 16B, and 16C illustrate operations performed by a display information generating unit 22 when the current playback point is on a Play Item #1.

FIG. 17 illustrates an example of the navigators displayed on the touch panel remote control 200.

FIGS. 18A, 18B, and 18C illustrate operations performed by the display information generating unit 22 when the current playback point is on a Play Item #2.

FIG. 19 illustrates an example of the navigators displayed on the touch panel remote control 200.

FIGS. 20A, 20B, and 20C illustrate operations performed by the display information generating unit 22 when the current playback point is on a Play Item #3.

FIG. 21 illustrates an example of the navigators displayed on the touch panel remote control 200.

FIG. 28 illustrates the display information stored in REMOTE1.DAT.

FIG. 29 illustrates the display information stored in REMOTE2.DAT.

FIG. 30 illustrates the display information stored in REMOTE3.DAT.

FIG. 32 shows contents of a description of the UO_mask_Table according to a third embodiment.

BEST MODE FOR CARRYING OUT THE INVENTION

First Embodiment

Figure 1:
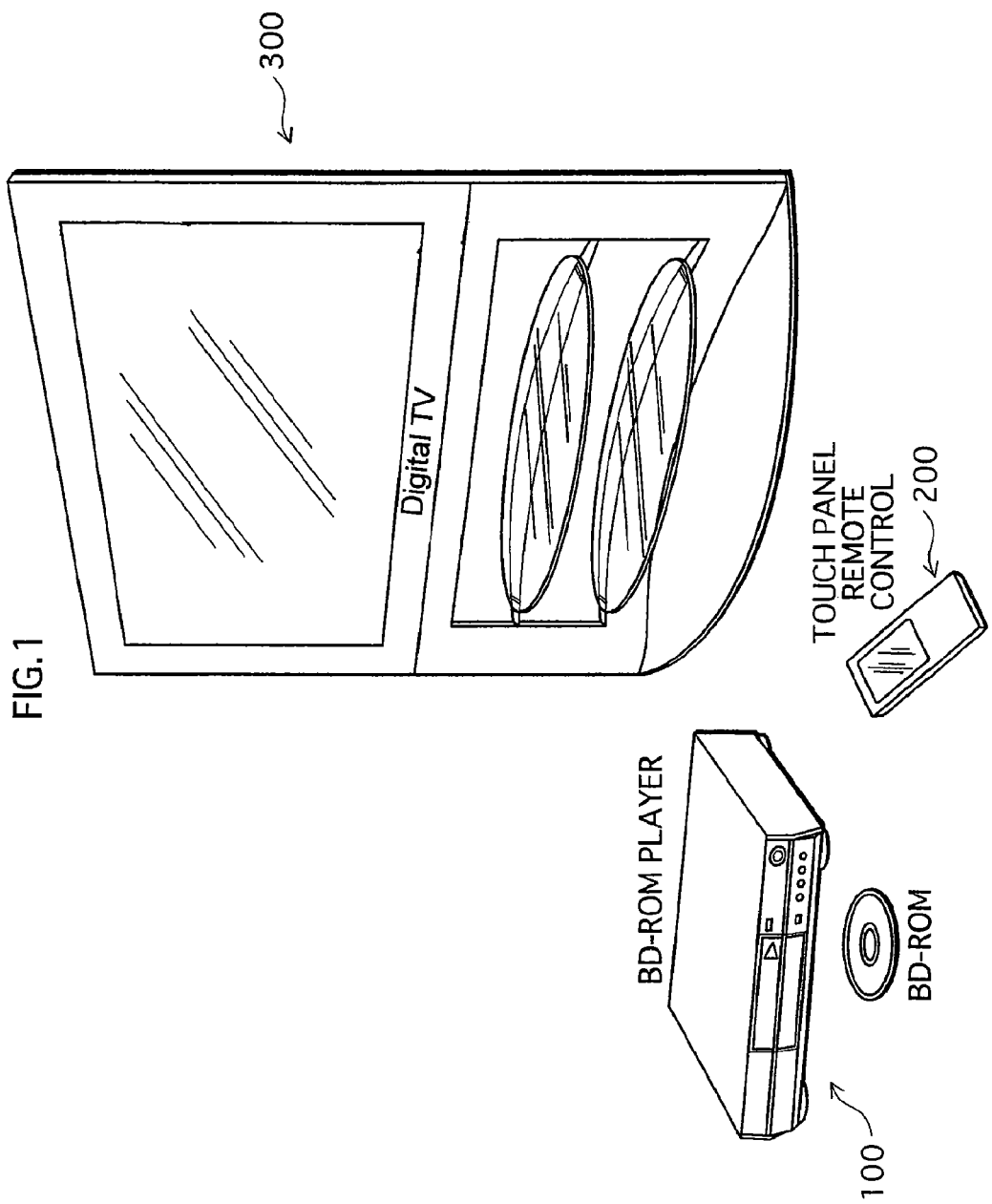
FIG. 1 illustrates an example of an application of a playback apparatus according to embodiments of the present invention.

The following is a description on a playback apparatus to which a first embodiment of the present invention relates. First, use of the playback apparatus is explained below. FIG. 1 shows an example of an application of the playback apparatus. In the drawing, the playback apparatus is a BD-ROM player 100. The BD-ROM player 100 is used in a home theater system that includes a touch panel remove control 200 as an example of a user control operation device and a television 300 as an example of a display screen in addition to the BD-ROM player 100.

Figure 2:
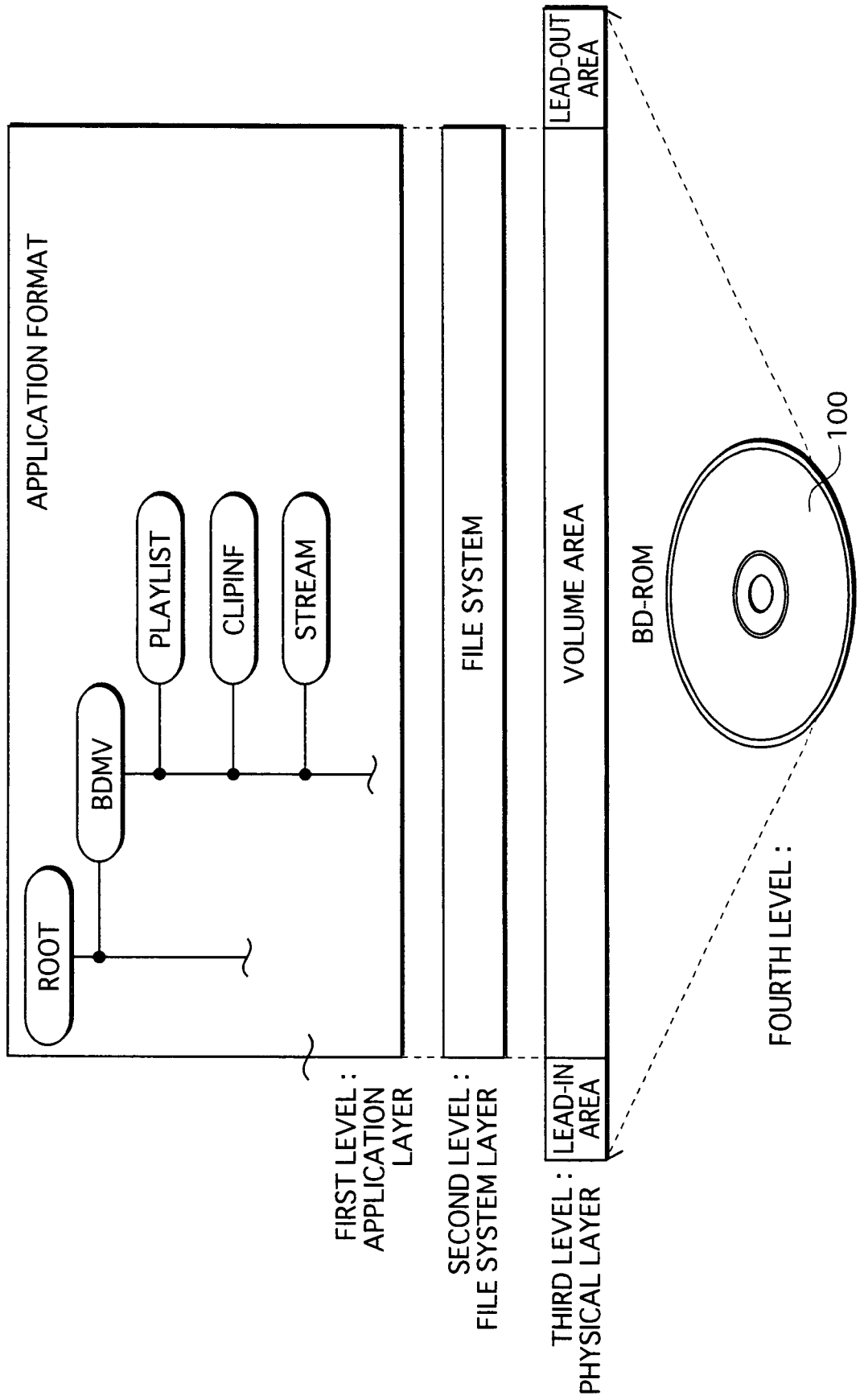
FIG. 2 illustrates a structure of a BD-ROM shown in FIG. 1.

Next, a recording medium that is played on the playback apparatus is explained. The recording medium can be realized by making improvements to an application layer of a BD-ROM. FIG. 2 shows an example of a structure of the BD-ROM.

Figure 3:
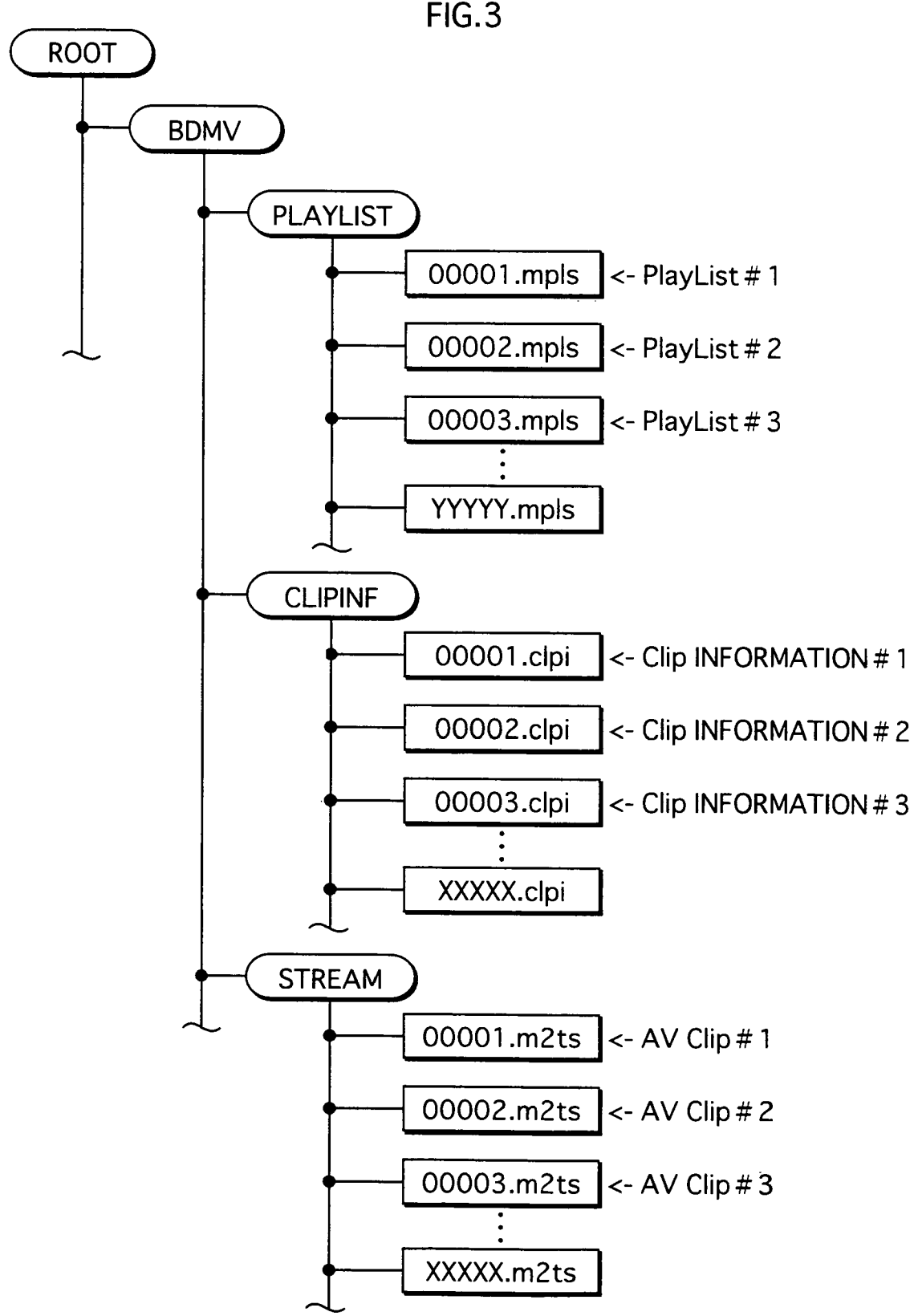
FIG. 3 illustrates a layout of an application layer (application format) of the BD-ROM.

In the drawing, the fourth level shows the BD-ROM, and the third level shows a track on the BD-ROM. The track at the third level depicts, in a laterally drawn-out form, the track spiraling from the inside to the outside of the BD-ROM. The track includes a lead-in area, a volume area, and a lead-out area. The volume area has a layer model consisting of a physical layer, a file system layer, and an application layer. FIG. 3 illustrates a format of the application layer (application format) of the BD-ROM in a directory structure.

FIG. 3 illustrates a layout of the application layer (application format) of the BD-ROM. In the drawing, the BD-ROM has a BDMV directory under a root directory. The BDMV directory contains three directories named a STREAM directory, a CLIPINF directory, and a PLAYLIST directory.

The STREAM directory stores AV Clips. Each of files named such as "00001.m2ts", "00002.m2ts", and "00003.m2ts" stored in the STREAM directory contains an AV Clip. These files are given names in a uniform format: "xxxxx.2mts" (x is any given integer).

The CLIPINF directory stores information of the AV Clip (Clip information). Each of files named such as "00001.clpi", "00002.clpi", and "00003.clpi" stored in the CLIPINF directory contains a piece of Clip information. These files are given names in a uniform format: "xxxxx.clpi" (x is any given integer).

The PLAYLIST directory stores Play List information. Each of files named such as "00001.mpls", "00002.mpls", and "00003.mpls" stored in the PLAYLIST directory contains a piece of PlayList information. These files are given names in a uniform format: "yyyyy.mpls" (y is any given integer)

<Structure of AV Clip>

Figure 4:
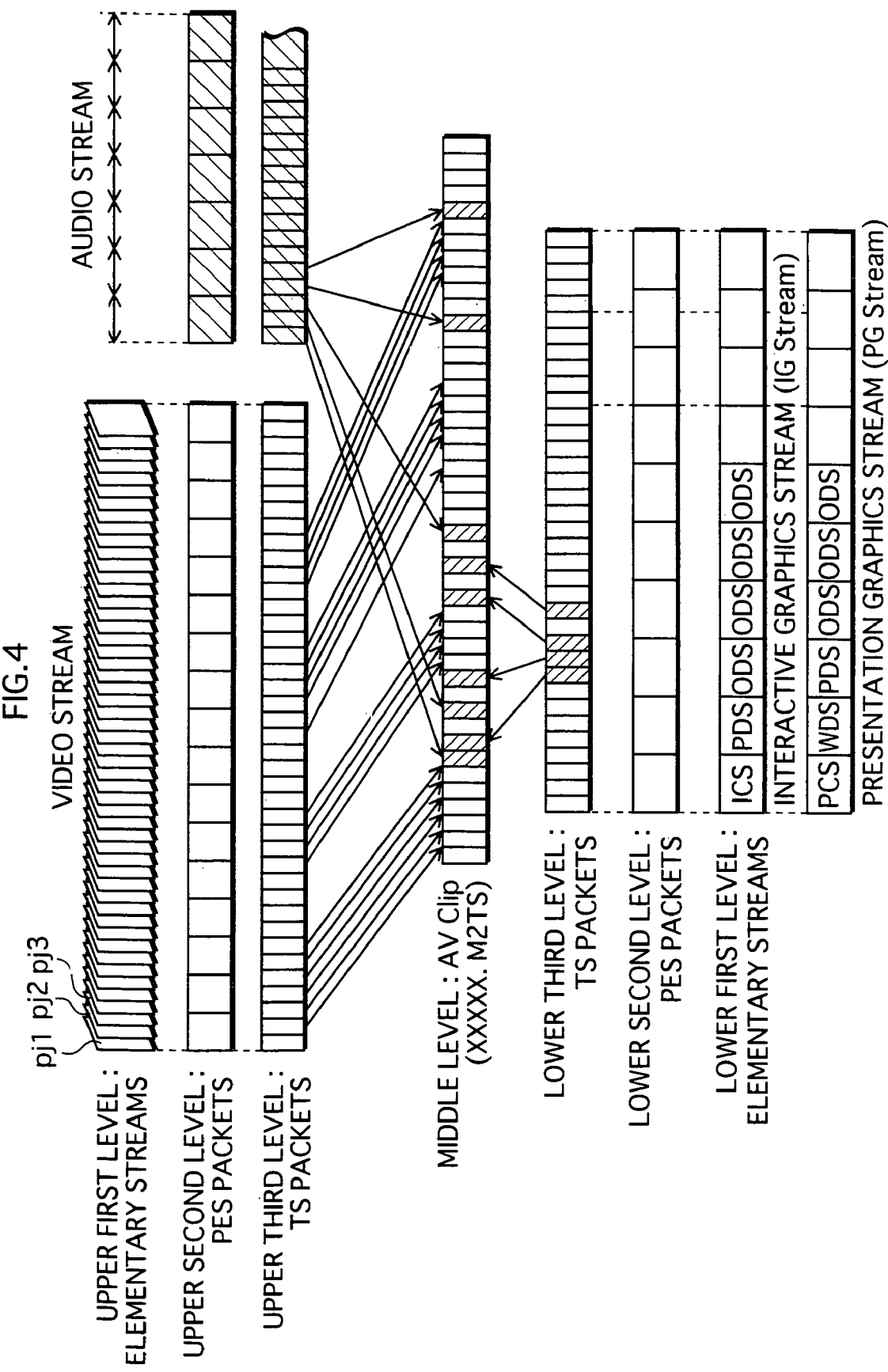
FIG. 4 schematically illustrates a structure of an AV Clip.

The following describes the AV Clip. FIG. 4 schematically shows how the AV Clip is structured.

In the drawing, the middle level shows the AV Clip. This AV Clip can be created as follows. A video stream made up of a plurality of video frames (pictures pj1, pj2, and pj3) and an audio stream made up of a plurality of audio frames on the upper first level are each converted to PES packets on the upper second level, and further converted to TS packets on the upper third level. Likewise, a subtitle-related presentation graphics stream (PG stream) and a dialogue-related interactive graphics stream (IG stream) on the lower first level are converted to a PES packet string on the lower second level, and further converted to TS packets on the lower third level. These TS packets of the video, audio, presentation, and interactive graphics streams are then multiplexed to form the AV Clip.

The PG streams are graphics streams that compose subtitles of different languages, and exist for a plurality of languages such as English, Japanese, and French.

Figure 5:
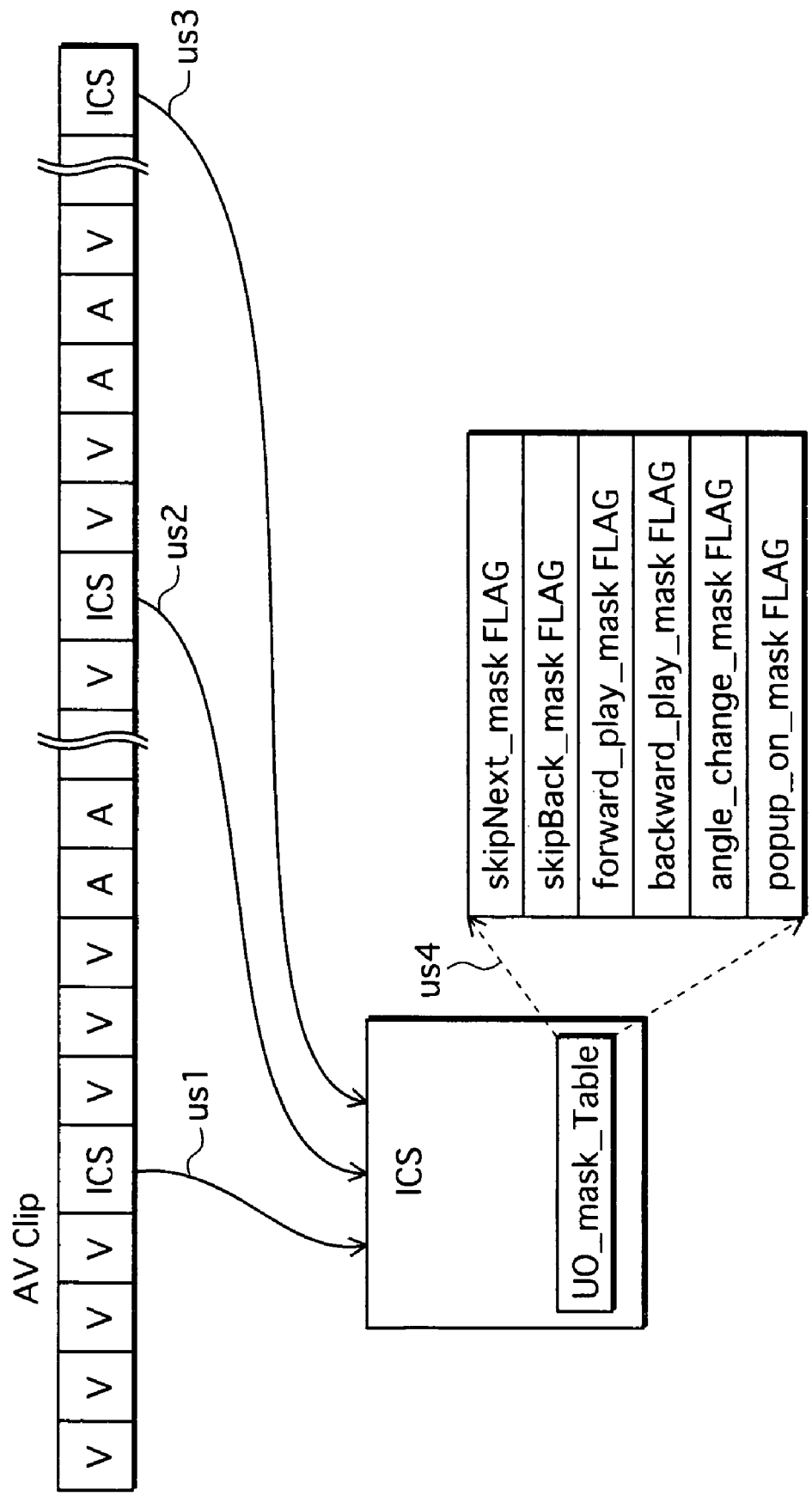
FIG. 5 illustrates an example of an ICS including UO_mask_Table.

The IG streams are graphics streams that realize interactive control. The interactive control defined by the interactive graphics stream is compatible with interactive control in a DVD playback apparatus. The interactive graphics streams is composed of functional segments called an Interactive Composition Segment (ICS), a Palette Definition Segment (PDS), an Object Definition Segment (ODS), and an END of Display Segment (END). The ODS is a functional segment that defines a graphics object, which is used to render a button on an interactive screen. The PDS is a functional segment that defines colors to be used in rendering the graphics object. The ICS is a functional segment that realizes changes in the state of the button in response to an operation by a user. A time period during which the ICS is active on a playback time-line of the AV Clip can be defined using two time-stamps called DTS and PTS. The ICS includes a UO_mask_Table in addition to control information for controlling menus. The UO_mask_Table is a flag to specify, when a request for execution of a playback control is queued during the time period in which the ICS is active, whether the playback control is executed according to the request or the request is masked. FIG. 5 illustrates an example of the ICS including UO_mask_Table.

The upper level in FIG. 5 shows the AV Clip. The AV Clip is constituted by the PES packets containing video data (PES packets "V" in the drawings), audio data (PES packets "A" in the drawings), and the ICSs. As shown in the drawing, the ICSs are incorporated in the AV Clip along with the video and audio data. The leaders us1, us2, and us3 in the drawing highlight the ICSs in the AV Clip. The ICS includes the UO_mask_Table, which includes, as shown by the leader us4 in dotted lines, a skip_next_mask flag, a skip_back_mask flag, a forward_play_mask flag, a backward_play_mask flag, a angle_change_mask flag, and a popup_on_mask flag.

The skip next_mask flag indicates whether the request should be masked or not, when the request queued by the user is a playback control for skipping to next.

The skip_back_mask flag indicates whether the request should be masked or not, when the request queued by the user is a playback control for skipping back.

The forward_play_mask flag indicates whether the request should be masked or not, when the request queued by the user is a playback control for fast-forwarding.

The backward_play_mask flag indicates whether the request should be masked or not, when the request queued by the user is a playback control for fast-rewinding.

The angle_change_mask flag indicates whether the request should be masked or not, when the request queued by the user is a playback control for changing angle.

The popup_on_mask flag indicates whether the request should be masked or not, when the request queued by the user is a playback control for calling a pop-up menu.

As described above, the AV Clip includes the ICS having such a UO_mask_Table. Therefore, it is possible to specify which user operation is to be masked or not for each possible type of playback control in the time period during which the ICS is active in the playback timeline of the video stream. By providing the UO_mask_Table in the ICS, it is possible to disable a specific type of playback controls, such as fast-forward and skip, in a time period during which a specific video is displayed in the playback timeline of the AV Clip. The above description indicates that the UO_mask_Table in the ICS near the current playback point in the playback timeline of the AV Clip determines what type of playback control is currently possible.

<Structure of Clip Information>

The following describes xxxxx.clpi.

Figure 6:
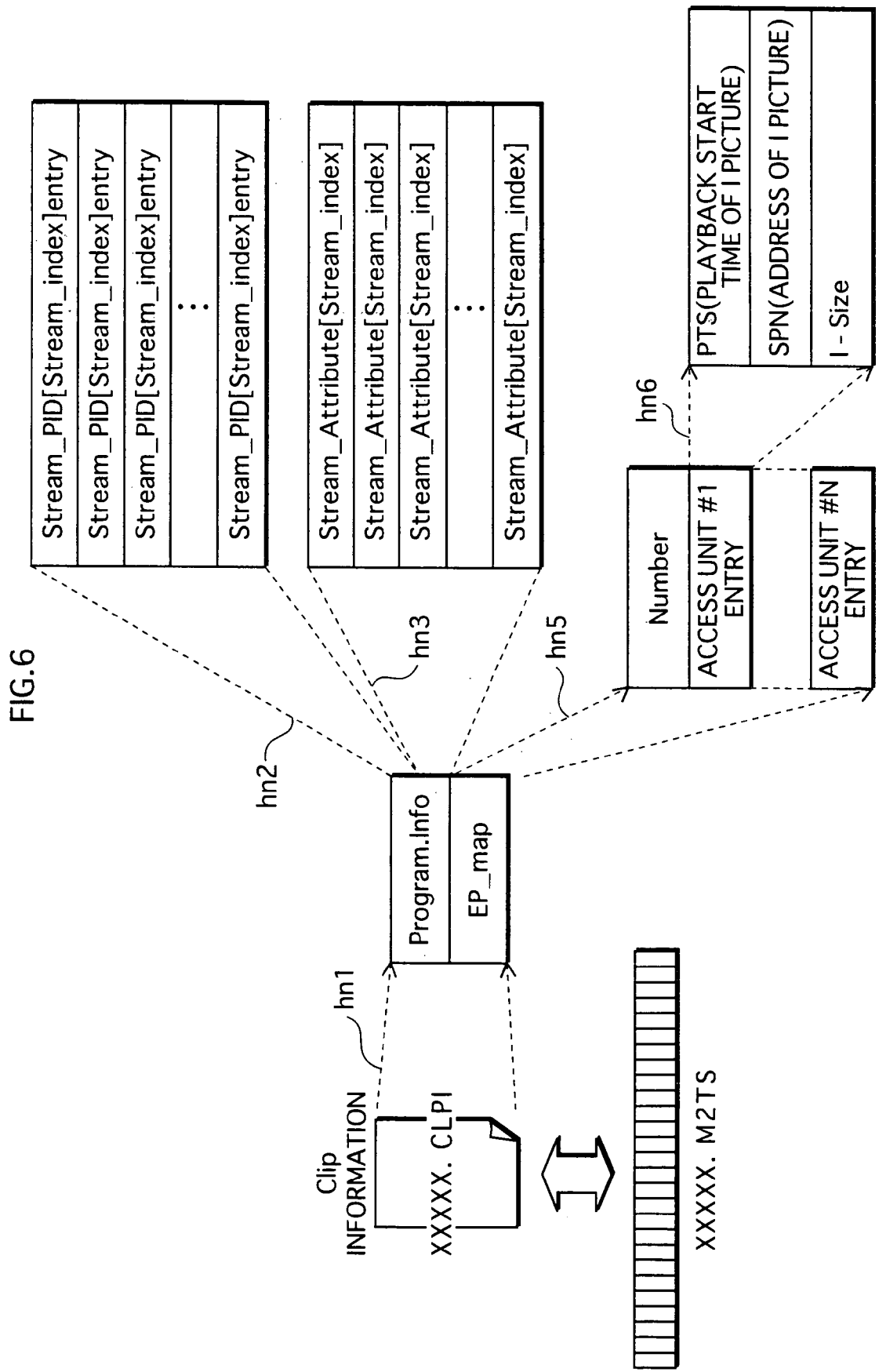
FIG. 6 illustrates an internal structure of Clip information.

The Clip information (xxxxx.clpi) is management information for individual AV Clips. FIG. 6 shows an internal structure of the Clip information. The leaders in FIG. 6 highlight the Clip information structure. As shown by the leader hn1, Clip information (xxxxx.clpi) comprises "Program Info." and "EP_map", which is a reference table for cueing the head of an I-picture.

"Program Info" is information showing a PID and attributes of each of a plurality of elementary streams, which are multiplexed on the AV Clip, in correspondence with stream_index. The stream_index is an index of the elementary streams multiplexed on an AV Clip to which the present Clip information corresponds. Supposing that the AV Clip that corresponds to the present Clip information is the AV Clip, the PIDs of the elementary streams identified in stream_index are a plurality of stream_PID[stream_index]entry shown by the dotted arrow hn2.

The attributes of the individual elementary streams are shown by a plurality of stream_Attribute[stream_index] shown by the dotted arrow hn3. These attributes include Video attribute, Audio attribute, and Graphics attribute. The Video attribute indicates the compression format used to compress the video stream (Coding), and the resolution (Resolution), the aspect ratio (Aspect) and the frame rate (Frame Rate) of individual pieces of picture data structuring the video stream. On the other hand, the Audio attribute indicates the compression format used to compress the audio stream (Coding), and the channel number (Ch.) and corresponding language (Lang) of the audio stream. The attributes of a particular elementary stream can be found from the Program Info via the stream_index.

EP_map is a reference table for referring indirectly to addresses of a plurality of cue positions using time information. As shown by the leader hn5, the EP_map includes plural pieces of entry information (ACCESS UNIT #1 entry, ACCESS UNIT #2 entry, ACCESS UNIT #3 entry, . . . ) and the number of entries (Number).

Each entry, as shown by the leader hn6, indicates a playback start time of a corresponding I-picture in correspondence with an address of the I-picture represented by a Source Packet Number (SPN) of the TS packet and a size (I-size) of the I-picture represented by a time stamp of the I-picture (Presentation Time Stamp). The filename "xxxxx" in xxxxx.clpi uses the same name as the AV Clip to which the Clip information corresponds. In other words, the filename of the Clip information in FIG. 6, being "xxxxx", corresponds to AV Clip (xxxxx.m2ts). Thus concludes the description of the Clip information.

<Structure of PL Information>

Figure 7:
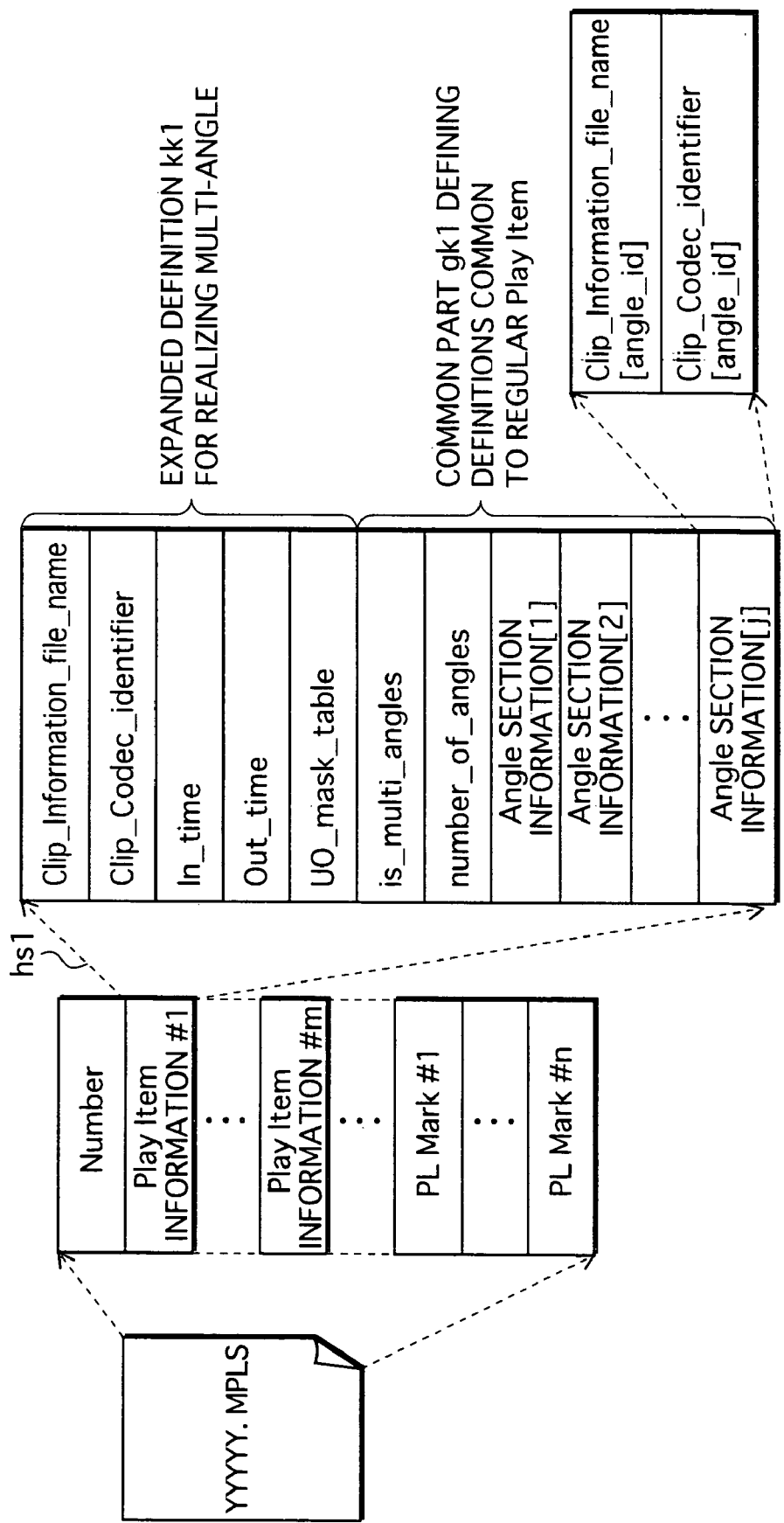
FIG. 7 illustrates a data structure of Play List information.

The Play List information (yyyyy.mpls) defines a play list (PL) indicating a playback order of contents. FIG. 7 illustrates a data structure of the Play List information. As shown in the drawing, the Play List information is constituted by "Play Item Information #1 to #m" and "PLMark #1 to #n". Each piece of the Play Item Information defines a playback section, and each piece of the PLMark prescribes a chapter included in the playback section. The Play Item Information is for a multi-angle Play Item. The Play Item Information defining a multi-angle playback section includes a common part gk1 that is common to a definition for a playback section of a common Play Item, and an expanded definition kk1 for realizing a multi-angle playback section. The Data of the common part gk1 is structured from a "Clip_Information_file_name" indicating a filename of playback section information relating to an AV Clip to which an In-point and an Out-point of the playback section belong, a "Clip_codec_identifier" showing an encoding form used to encode the AV Clip, an "In_time" showing a start of the playback section, an "Out_time" showing an end of the playback section, and the "UO_mask_Table" indicating a masked playback control.

Figure 8:
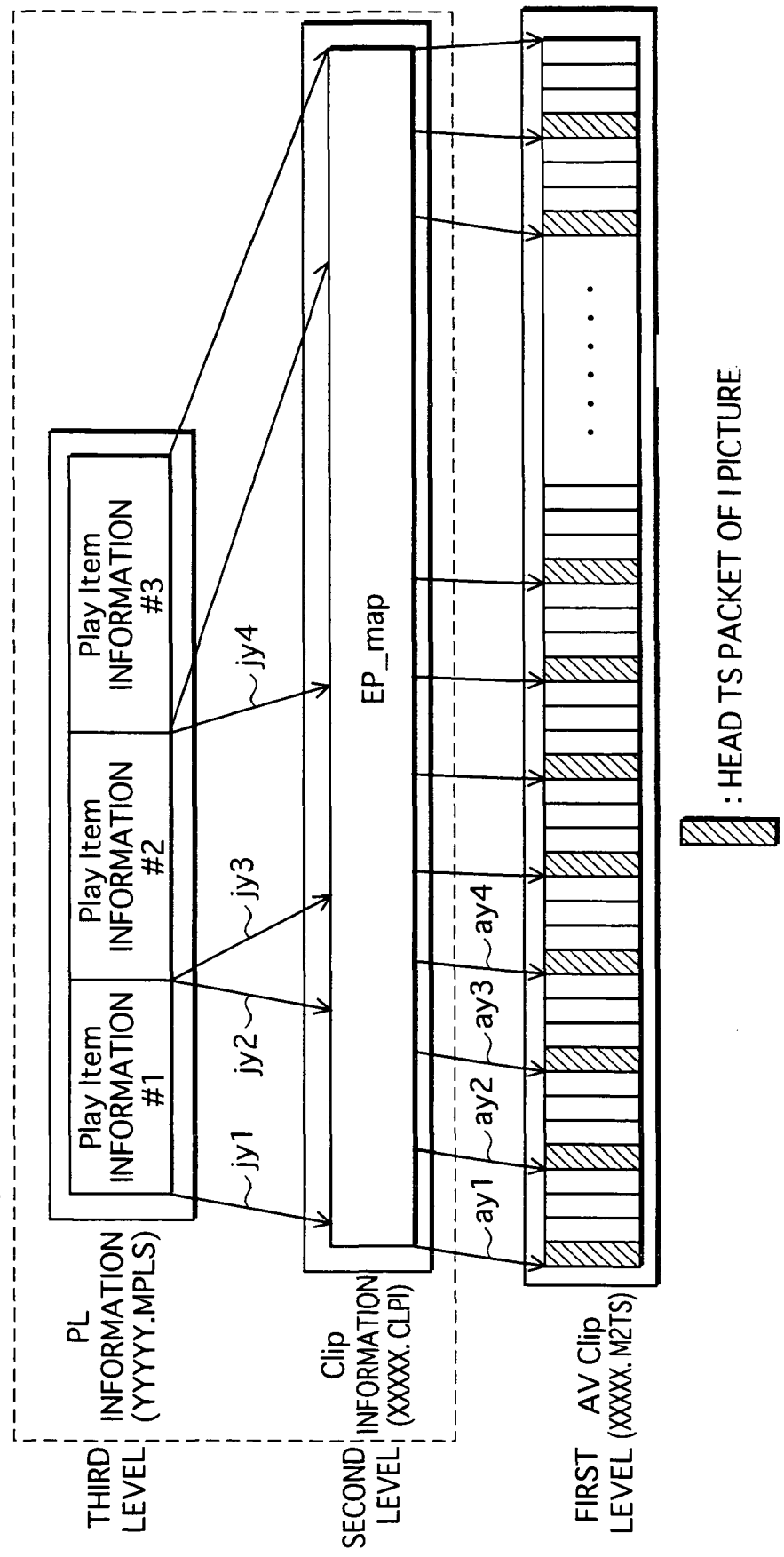
FIG. 8 schematically illustrates an indirect referencing using the Play List information.

A characteristic of the common definition of the Play Item information is the notation based on a conversion between time information and an address. Specifically, the playback section is defined in an indirect referencing format that uses the EP_map as a reference table. FIG. 8 schematically illustrates the indirect referencing using the play list information. In the drawing, the AV Clip is constituted by multiple TS packets. The EP-map in the Clip information specifies sector addresses of the TS packets, as shown by arrows ay1, ay2, ay3 and ay4. Arrows jy1, jy2, jy3 and jy4 in the drawing schematically show the referencing of the TS packets using the Play Item information. In other words, the referencing using the Play Item information (the arrows jy1, jy2, jy3, and jy4) involves indirect referencing in which the addresses of the TS packets included in the AV Clip are specified via the EP-map.

A playback section on the BD-ROM formed from the Play Item information, Clip information, and AV Clip that is a "Play Item". A movie work recorded on a BD-ROM is structured by more than one Play Item, which is a logical playback unit. Because the movie work on the BD-ROM is structured in the logical playback units, it is possible to effectively reutilize AV Clips of scenes from a certain movie work in a different movie work.

Figure 9:
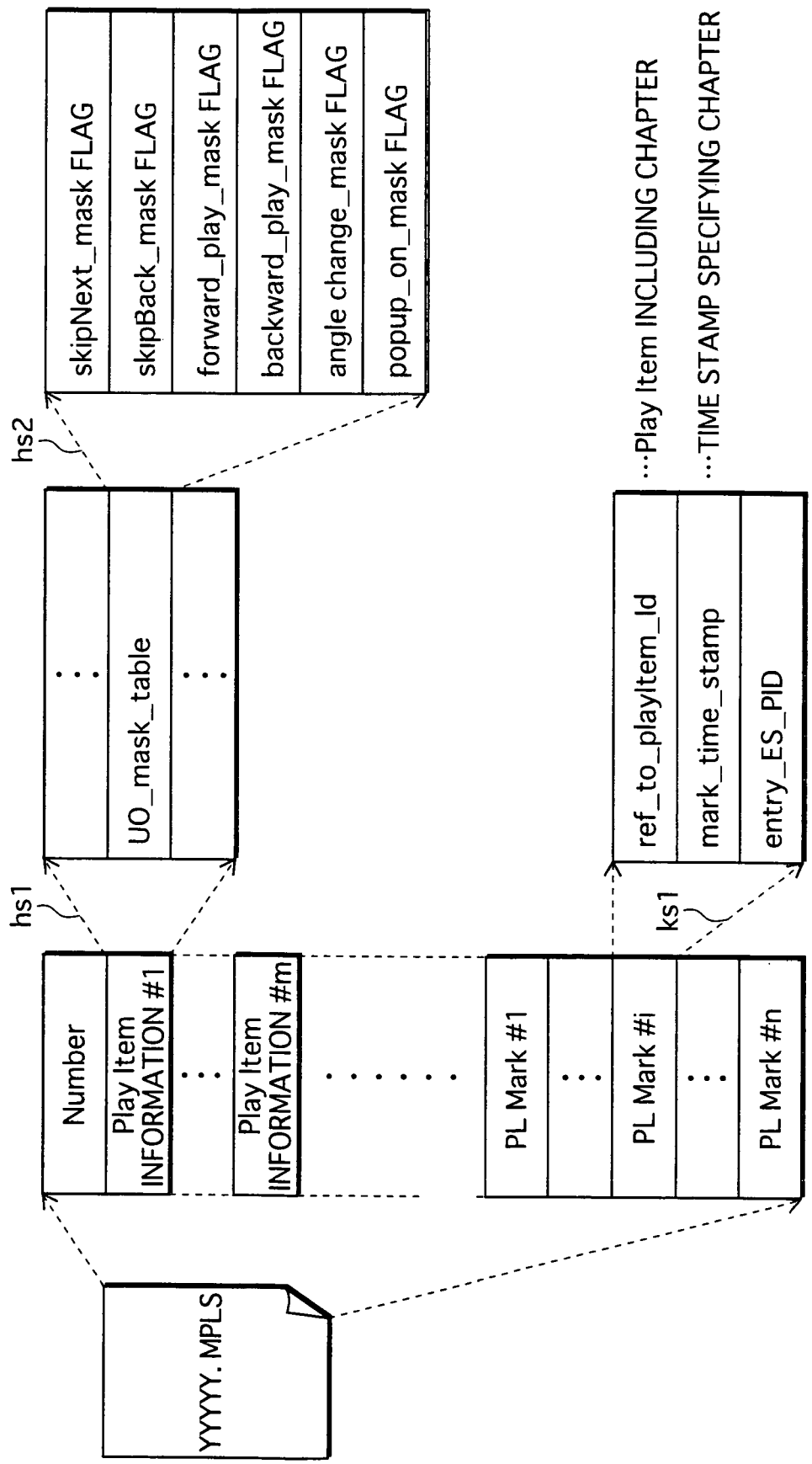
FIG. 9 illustrates the UO_mask_Table and PLMark in a Play Item.

The greatest merit of the Play Item is being able to increase the range of a moviemaker's expression, since the variations of a movie work increase simply by defining different pieces of the PL information. FIG. 9 illustrates the UO_mask_Table and PLMark in the Play Item. The Play Item, as shown by the leader hs1 in the drawing, includes the UO_mask_Table that is identical to the UO_mask_Table in the ICS. Accordingly, it is possible to define the playback control to be masked for each Play Item. Because the Play Item includes the UO_mask_Table, it is possible to specify whether each possible playback control should be enabled or disabled in a time period in which one Play Item is active on a playback timeline of the PL. From the above description, it is clear that the UO_mask_Table of the Play Item to which the current playback point in the playback timeline belongs determines what type of playback control is currently possible.

Next, the following describes the PLMark. The PLMark defines a chapter in the playback section corresponding to the PL. The leader ks1 in the drawing highlights an internal structure of a given PLMark [i] out of multiple PLMarks. As shown in the drawing, the PLMark [i] includes a "ref_to_Play Item_Id" and a "mark_time_stamp".

The ref_to_Play Item_Id indicates a Play Item in which a point in the playback timeline of the AV Clip specified by the PLMark exists.

The mark_time stamp identifies a time period from the In_time to Out_time of the Play Item specified by the ref_to_the Play Item of the PLMark as a chapter in the Play Item, in the playback timeline of the AV Clip specified by the PLMark.

Next, the following describes the data structure of the expanded definition in the Play Item in accordance with FIG. 7.

The data structure of the expansion to realize the multi-angling includes "is_multi_angles", "number_of_angles", and "Angle Information [1], [2], . . . [j]".

The is_multi_angles indicates whether the playback section corresponding to the Play Item is a multi angle section or a non multi angle section.

The number_of_angles indicates, when the is_multi_angles is set to be the multi angle section, how many angles exist in the multi angle section.

Pieces of the Angle Information [1] [2] . . . [j] are information relating to individual angle sections in the multi angle section, and each piece of Angle Information includes the "Clip_Information_file_name" and the "Clip_codec_identifier".

The Clip_Information_file_name indicates the filename of the AV Clip constituting the angle section.

The Clip_codec_identifier indicates the encoding form used to encode the AV Clip with the name indicated by the Clip_Information_file name in the Angle Information.

As described above, the Angle Information does not include an In_time and an Out_time. This is because, in the angle section, a starting point and an ending point of the Play Item are specified by the In_time and Out_time in the common definition. Accordingly, the AV Clip specified by the Clip_Information_file_name in the Angle Information should have the same playback time as the AV Clip specified by the Clip_Information_file_name in the common definition. Further, a time stamp (System Time Clock) to specify a playback timing of each AV Clip should be strictly synchronized in the playback timeline of the AV Clip between the both AV Clips.

Figure 10:
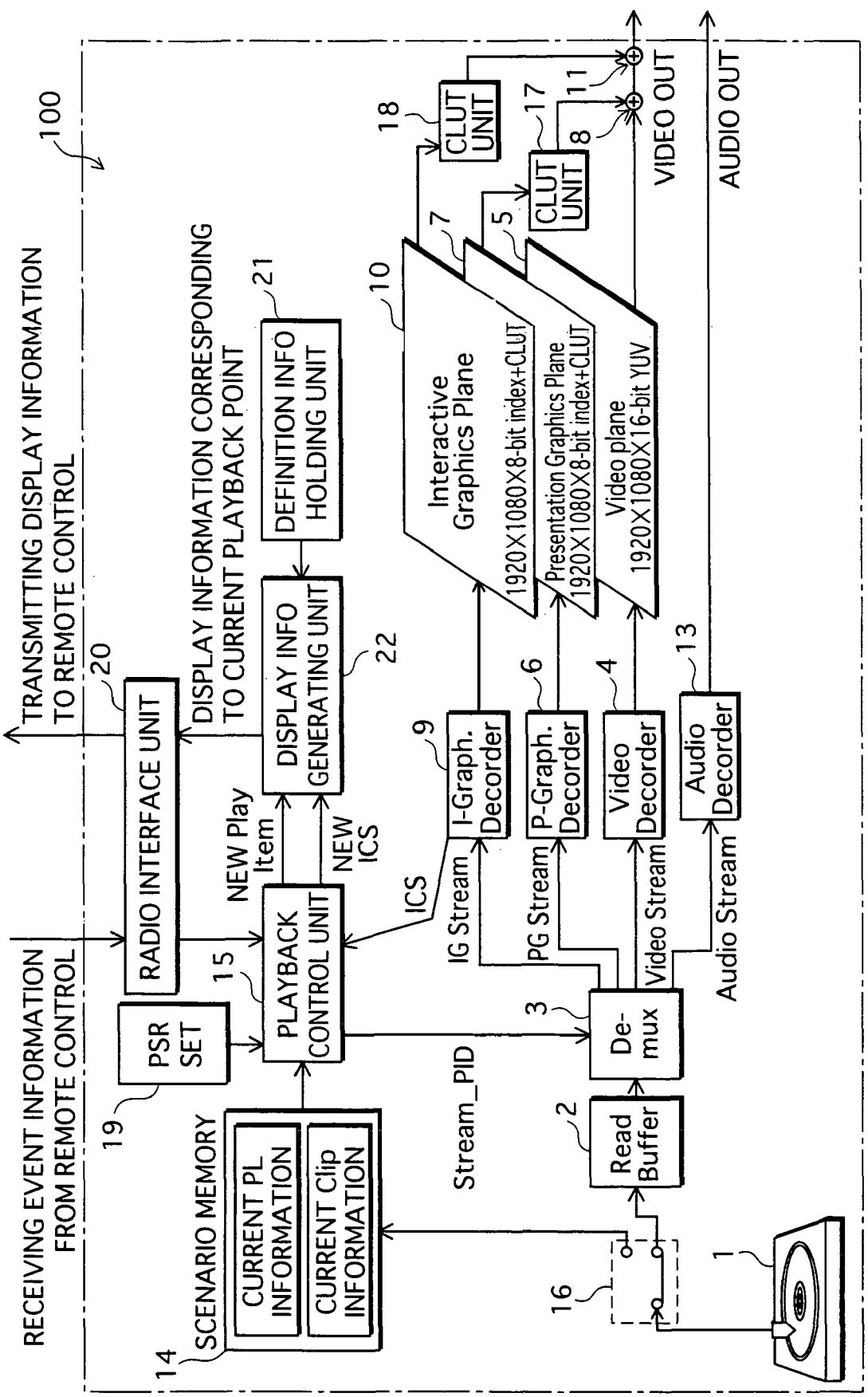
FIG. 10 illustrates an internal structure of the playback apparatus according to the present invention.

The above described the recording medium. Next, the following describes the playback apparatus of the present embodiment according to the present invention. FIG. 10 illustrates an internal structure of the playback apparatus according to the present invention. The playback apparatus according to the present invention may be industrially manufactured based on the internal structure illustrated in FIG. 10. The playback apparatus according to the present invention is constituted mainly by two components: a system LSI and a drive device. The playback apparatus according to the present invention can be industrially manufactured by mounting these components to a cabinet and a substrate of the apparatus. The system LSI is an integrated circuit in which multiple processing units that performs various functions of the playback apparatus are integrated. The playback apparatus manufactured as above includes a BD-ROM drive, a read buffer 2, a demultiplexer 3, a video decoder 4, a video plane 5, a P-Graphics decoder 6, a Presentation Graphic plane 7, a composition unit 8, an I-Graphics decoder 9, a Interactive Graphic plane 10, a composition unit 11 an audio decoder 13 a scenario memory 14, a playback control unit 15, a switch 16, the CLUT unit 17, a CLUT unit 18, a PSR set 19, a radio interface unit 20, a definition info holding unit 21, and a display info generating unit 22.

The BD-ROM drive 1 performs loading and ejecting of a BD-ROM, and accesses the loaded BD-ROM.

The read buffer 2 is a FIFO memory that stores TS packets read from the BD-ROM on a first-in first-out basis.

The demultiplexer (De-MUX) 3 extracts the TS packets from the read buffer 2 and converts the extracted TS packets into PES packets. The demultiplexer 3 then outputs any of the obtained PES packets that have a streamPID set by the playback control unit 15 to the video decoder 4, the audio decoder 13, the P-Graphics decoder 6 or the I-Graphics decoder 9.

The video decoder 4 obtains uncompressed pictures by decoding the PES packets output by the demultiplexer 3 and writes the obtained pictures to the Video plane 5.

The video plane 5 is for storing the uncompressed pictures. A plane is a memory area for storing pixel data of one screen in the playback apparatus. By providing a plurality of planes in the playback apparatus, and adding together the storage contents of the planes for each pixel and outputting the resulting video, video that is a combination of a plurality of video contents can be output. The resolution of the Video plane 5 is 1920×1080, and picture data stored in the Video plane 5 is composed of pixel data expressed as 16-bit YUV values.

The P-Graphics decoder 6 decodes a graphics stream read from the BD-ROM or a HD to obtain uncompressed graphics, and writes the obtained uncompressed graphics to the Presentation Graphic plane 7. Subtitles appear on the screen as a result of decoding the graphics stream.

The Presentation Graphic plane 7 is a memory that has an area corresponding to one screen, and stores uncompressed graphics for one screen. The resolution of the Presentation Graphics plane 7 is 1920×1080, and each pixel of the uncompressed graphics stored in the Presentation Graphic plane 7 is expressed as an 8-bit index color. The index color of the uncompressed graphics stored in the Presentation Graphic plane 7 is converted using a Color Lookup Table (CLUT) for use in display.

The composition unit 8 composites the content stored in the Presentation Graphic plane 7 with uncompressed picture data (i).

The I-Graphics decoder 9 decodes an IG stream read from the BD-ROM or the HD to obtain uncompressed graphics, and writes the obtained uncompressed graphics to the Interactive Graphic plane 10.

The Interactive Graphic plane 10 stores the uncompressed graphics obtained by the decoding by the I-Graphics decoder 9.

The composition unit 11 composites the contents stored in the Interactive Graphic plane 10 with a composite image that is an output from the composition unit 8 (as a result of the composing of the uncompressed pictured at a with the content stored in the Presentation Graphic plane 7).

The audio decoder 13 outputs uncompressed audio data by decoding the PES packets output by the demultiplexer 3.

The scenario memory 14 is a memory for storing current PL information, current Clip information, and the like. The current PL information is a piece of the PL information that is currently targeted for processing among a plurality of pieces of the PL information recorded on the BD-ROM. The current clip information is a piece of the Clip information that is currently targeted for processing among a plurality of pieces of the Clip information recorded on the BD-ROM.

The playback control unit 15 reads the AV Clip recorded on the BD-ROM and performs the playback control to the read AV Clip, according to the current PL information and the current Clip information read to the scenario memory 14. In performing the playback control, the demultiplexer 3 specifies a current Play Item from the current PL information, and access the AV Clip specified by the Clip_information_file_name of the current Play Item. Then, the demultiplexer 3 refers to the current Clip information and controls the BD-ROM drive 1 to read, from the AV Clip, the TS packets that correspond to the period from In_time to Out_time of the current Play Item. The read TS packets are input to the video decoder 4, the P-Graphics decoder 6, the I-Graphics decoder 9, and the audio decoder 13, sequentially, via the demultiplexer 3, and the AV Clip is played back. When the touch panel remote control 200 accepts an operation from the user, the playback control unit 15 performs the playback control based on event information from the touch panel remote control 200, such as menu call, angle change, skip back, skip next, fast-forward, and fast-rewind.

The switch 16 allows selective input of various data read from the BD-ROM to the read buffer 2 and the scenario memory 14.

The CLUT unit 17 converts the index colors of the uncompressed graphics stored in the Presentation Graphic plane 7 into values expressed in Y, Cr, and Cb values.

The CLUT unit 18 converts the index colors of the uncompressed graphics stored in the Interactive Graphic plane 10 into values expressed in Y, Cr, and Cb values.

The PSR set 19 is a register set provided in the playback apparatus, and includes 64 Player Status Registers (PSRs) and 4096 General Purpose Registers (GPRs). Each of the 64 Player Status Registers (PSRs) indicates a status of the playback apparatus, such as the current playback point. PSR5, PSR6, PSR7, and PSR8 out of the 64 Player Status Registers indicate the current playback point.

The PSR5 indicates a number of a chapter to which the current playback point belongs by a value from 1 through 999. When the PSR5 is set to 0xFFFF, the PSR5 indicates the chapter number of the playback apparatus is not effective.

The PSR6 indicates a number of a PL (Current PL) to which the current playback point belongs by a value from 0 through 999.

The PSR7 indicates a number of a Play Item (current Play Item) to which the current playback point belongs by a value from 0 through 999.

The PSR8 indicates a current playback point (current PTM) using a 45 KHz time accuracy by a value from 0 through 0xFFFFFFFF.

The radio interface unit 20 is an input/output interface with the touch panel remote control 200. The input from the touch panel remote control 200 indicates an input of user event information showing the user operation to the touch panel remote control. The output to the touch panel remote control 200 indicates an output of screen information.

The definition information holding unit 21 holds definition information defining a GUI component. The GUI component is used to structure a navigator that is to be displayed in touch panel remote control 200. Examples of the definition information are button information defining a button and text information defining a text to be displayed. FIG. 11A shows an example of the definition information that defines a button. A declaration "button xxx:yyy" declares that the GUI component defined by this definition is a button "xxx" set to a state "yyy". The button is expressed by displaying characters "aaa" indicated by "name=aaa" and an image bbb indicated by "image=bbb" at a position "ccc" indicated by "position=ccc". The state of the button is shown either as "active" or "inactive". When the state is active, the button is displayed in colors in high brightness and/or saturation. When the state is inactive, the button is displayed in colors with low brightness and/or saturation (gray-out). An event "ddd" in "event=ddd" indicates an event to be output from the touch panel remote control 200 when the corresponding button is operated while the button is active.

FIG. 11B shows an example of the definition information that defines a text. A declaration "text eee:fff" declares that the GUI component defined by this definition is a text "eee" in a color "fff". The text is expressed by displaying characters "ggg" indicated by "name=ggg" at a position "hhh" indicated by "position=hhh". The color of the text is shown either in "normal" or "reversal".

The display information generating unit 22 judges, every time when a new Play Item or a new ICS is read into the display information generating unit 22, whether or not there is a new playback control that is either enabled or disabled. If such a new playback control is found, the display information generating unit 22 generates display information showing whether each playback control is enabled or disabled. Given that there are 6 types of playback control such as menu call, angle change, skip back, skip next, fast-forward, and fast-rewind, the display information generating unit 22 generates the display information including seven pieces of button information and a piece of text information as shown in FIG. 12, based on the definition information for the button and the text held in the definition information holding unit 21. FIGS. 12A to 12H are examples of the display information indicating whether the seven playback controls including menu call, changing to angle 1, changing to angle 2, skip back, skip next, fast-forward, and fast-rewind are enabled or disabled.

Button information 1 shown in FIG. 12A is the button information for rendering a button of a star shaped figure with characters "Menu" on the figure, and notifies the user that it is possible to call a menu.

Text information shown in FIG. 12B is the text information for rendering characters indicating the angle section.

Button information 2 shown in FIG. 12C is the button information for rendering a button of an oval figure with a character of a number "1" on the figure, and notifies the user that it is possible to change the angle to the angle 1.

Button information 3 shown in FIG. 12D is the button information for rendering a button of an oval figure with a character of a number "2" on the figure, and notifies the user that it is possible to change the angle to 2.

Button information 4 shown in FIG. 12E is the button information for rendering a button of an arrow figure pointing to the left with characters "Previous" on the figure, and notifies the user that it is possible to instruct an operation for skipping back to a previous chapter (SkipBackChapter).

Button information 5 shown in FIG. 12F is the button information for rendering a button of an arrow figure pointing to the right with characters "Next" on the figure, and notifies the user that it is possible to instruct an operation for skipping next to a previous chapter (SkipNextChapter).

Button information 6 shown in FIG. 12G is the button information for rendering a button of a pentagonal figure pointing to the left with characters "Fast-Rewind" on the figure, and notifies the user that it is possible to perform the fast-rewind.

Button information 7 shown in FIG. 12G is the button information for rendering a button of a pentagonal figure pointing to the right with characters "Fast-Forward" on the figure, and notifies the user that it is possible to perform the fast-forward.

The display information including the button information generated as above is generated by the display information generating unit 22 and handed to the radio interface unit 20.

Figure 13:
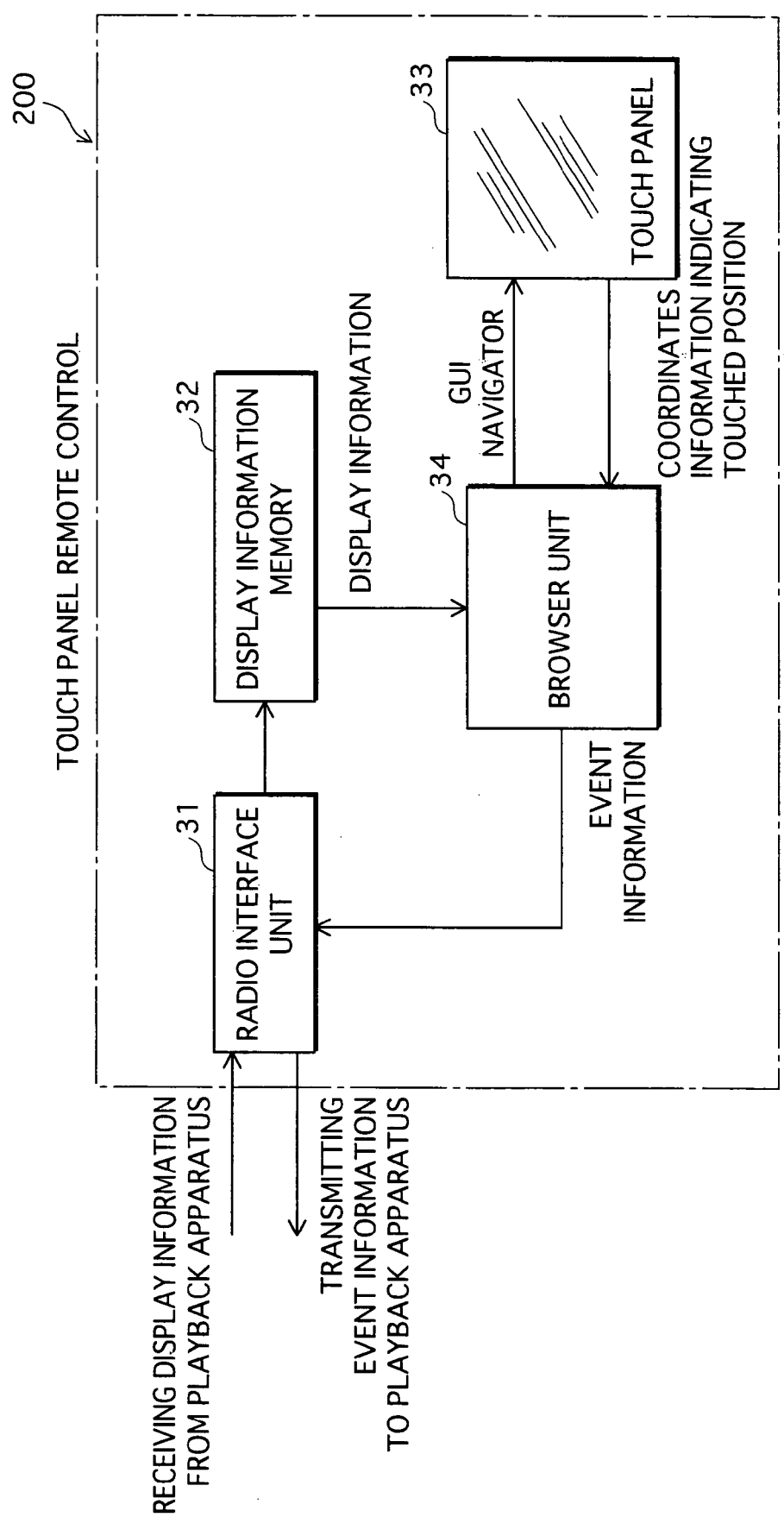
FIG. 13 illustrates an internal structure of a touch panel remote control 200.

The following describes an internal structure of the touch panel remote control 200. FIG. 13 illustrates the internal structure of the touch panel remote control 200. As shown in the drawing, the touch panel remote control 200 comprises a radio interface unit 31, a display information memory 32, a touch panel 33, and a browser unit 34.

The radio interface unit 31 is an input and output interface with the playback apparatus. The input from the playback apparatus indicates an input of the display information from the playback apparatus. The output to the playback apparatus indicates an output of the user event information showing the user operation from the touch panel remote control 200 to the playback apparatus.

The display information memory 32 is a memory for storing the display information input via the radio interface unit 31.

The touch panel 33 is a liquid crystal display having a function of outputting coordinates of a position on the screen at which the user touch.

The browser unit 34 interprets the display information stored in the display information memory 32, causes the touch panel 33 to display the navigator, and accepts the input operation from the user via the navigator. The browser unit 34 accepts the user operation in a following manner; a coordinates indicating the position on the touch panel 33 is accepted from the touch panel 33, a button that corresponds the coordinates is interpreted as a "touched button", and then the touch panel remote control 200 transmits the "event" described in the button information defining the button interpreted as the "touched button".

Figure 14:
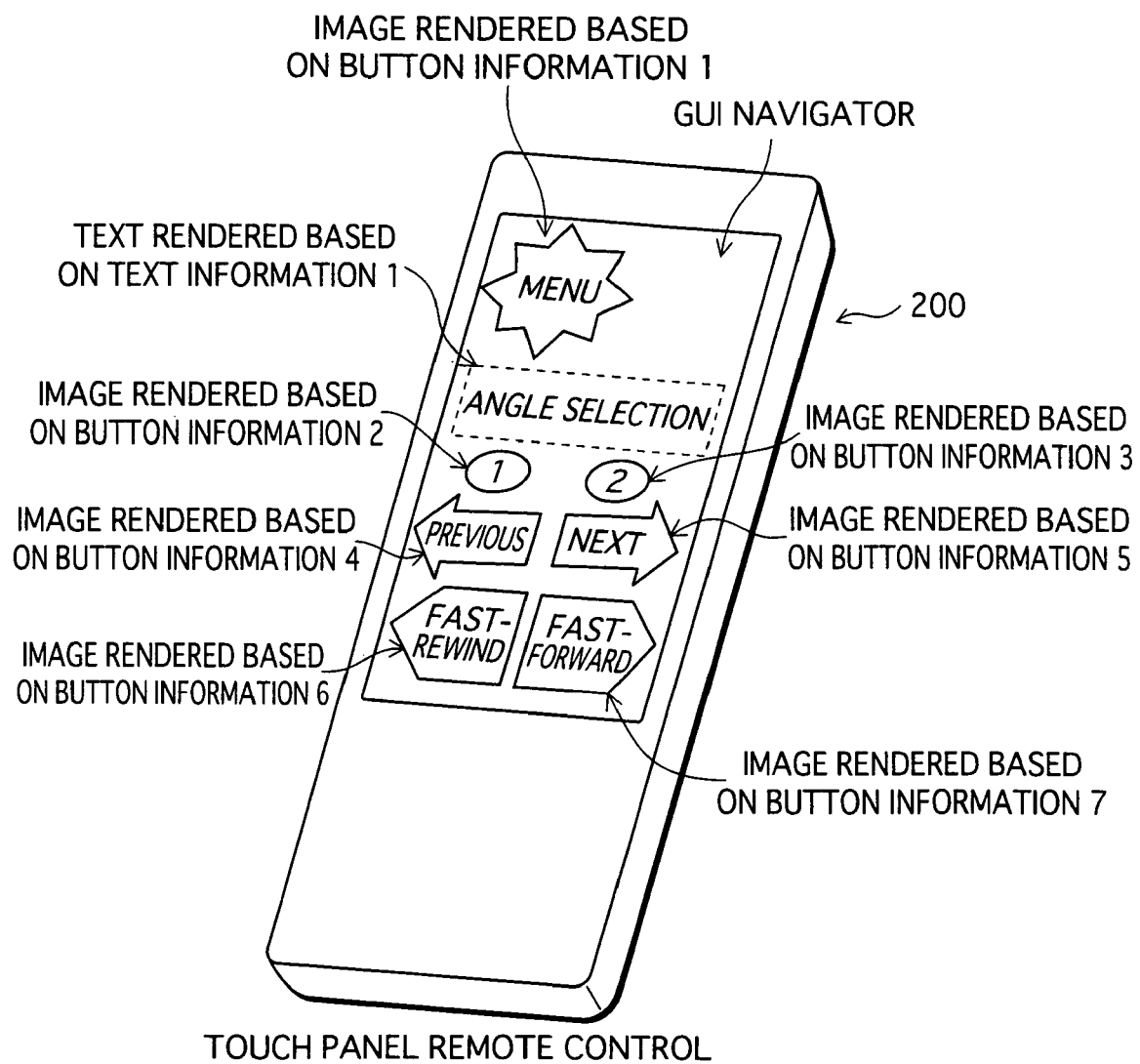
FIG. 14 is an example of navigators.

Upon transmission of the display information including the button information and the text information shown in FIGS. 12A-12H, the navigators as shown in FIG. 14 appear on the touch panel 33 of the touch panel remote control 200. The navigators are the star figure with the characters "Menu" on the figure, the oval figures with the character of the numbers "1" and "2" on the figure, the arrow figure pointing to the left with the characters "Previous" on the figure, the arrow figure pointing to the right with the characters "Next" on the figure, the pentagonal figure pointing to the left with the characters "Fast-Rewind" on the figure, and the pentagonal figure pointing to the right with the characters "Fast-Forward" on the figure. The navigators including the above figures are displayed on the touch panel remote control 200. If the user knows the indication of each figure of the navigators, the user can know what kind of playback control is possible at the current playback point.

Figure 15:
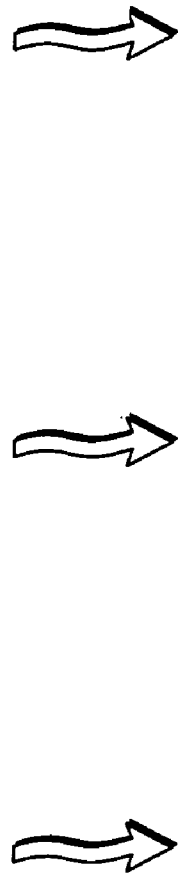
FIG. 15 illustrates three Play Items.

The following describes a change of contents of the navigators as the playback point proceeds with reference to a specific example. In this example, three Play Items shown in FIG. 15 are taken as an example. One movie work is formed by the three Play Items: a Play Item #1, a Play Item #2, and a Play Item #3. The Play Item #1 is for a non multi angle section, and defined by the UO_mask_Table of the Play Item as menu call =enabled, angle change=disabled, skip next=enabled, fast-forward=enabled, skip back=disabled, and fast-rewind =disabled. When the current playback point is on the Play Item #1 as shown in FIG. 16A, the display information generating unit 22 generates, according to the definition of the UO_mask_Table, the display information as shown in FIG. 16B. In the display information shown in FIG. 16B, the buttons 2, 3, 4, and 6 are described as being disabled. The buttons that are defined as disabled are replaced with images in gray-out figures, and the events corresponding to the buttons are set to "none". Upon transmission of such display information from the playback apparatus to the touch panel remote control 200, as shown FIG. 16C, the navigators as shown in FIG. 17 are displayed on the touch panel remote control 200.

As shown in FIG. 17, the previous button and the fast-rewind button are displayed in gray-out colors, and text "no angle section" is displayed instead of the angle button. Accordingly, only by looking at the GUI, the user can know that it is not possible to perform the operations of the fast-rewind and the jump to the previous chapter.

The Play Item #2 is for a multi angle section, and defined by the UO_mask_Table of the Play Item as menu call=enabled, angle change=enabled, skip next=enabled, fast-forward=enabled, skip back=enabled, and fast-rewind=enabled. When the current playback point is on the Play Item #2 as shown in FIG. 18A, the display information generating unit 22 generates, according to the definition of the UO_mask_Table, the display information as shown in FIG. 18B. In the display information ilustrated in FIG. 18B, the buttons 1 to 7 are described as being enabled. The buttons that are defined as enabled are replaced with images that are not in gray-out figures, and the events corresponding to the buttons are enabled. Upon transmission of such display information from the playback apparatus to the touch panel remote control 200, as shown FIG. 18C, the navigators as shown in FIG. 19 are displayed on the touch panel remote control 200.

The Play Item #3 is for a non multi angle section, and defined by the UO_mask_Table of the Play Item as menu call=enabled, angle change=disabled, fast-forward=disabled, skip next= disabled, skip back=enabled, and fast-rewind=enabled. When the current playback point is on the Play Item #3 as shown in FIG. 20A, the display information generating unit 22 generates, according to the definition of the UO_mask_Table, the display information as shown in FIG. 20B. In the display information shown in FIG. 20B, the buttons 2, 3, 5, and 7 are described as being disabled. The buttons that are defined as disabled are replaced with images in gray-out figures, and the events corresponding to the buttons are set to "none". Upon transmission of such display information from the playback apparatus to the touch panel remote control 200, as shown in FIG. 20C, the navigators as shown in FIG. 21 are displayed on the touch panel remote control 200.

As shown in FIG. 21, the next button and the fast-forward button are displayed in gray-out colors, and text "no angle section" is displayed instead of the angle button. Accordingly, only by looking at the GUI, the user can know that it is not possible to perform the operations of the fast-forward and the jump to the next chapter.

The playback control unit 15 and the display information generating unit 22 as described above can be realized by describing a program for executing operations shown in FIGS. 22 to 26, and having a general-purpose CPU execute the program. The following describes specific control procedures that realize the playback control unit 15 and the display information generating unit 22 with reference to flowcharts shown in FIGS. 22 to 26.

Figure 22:
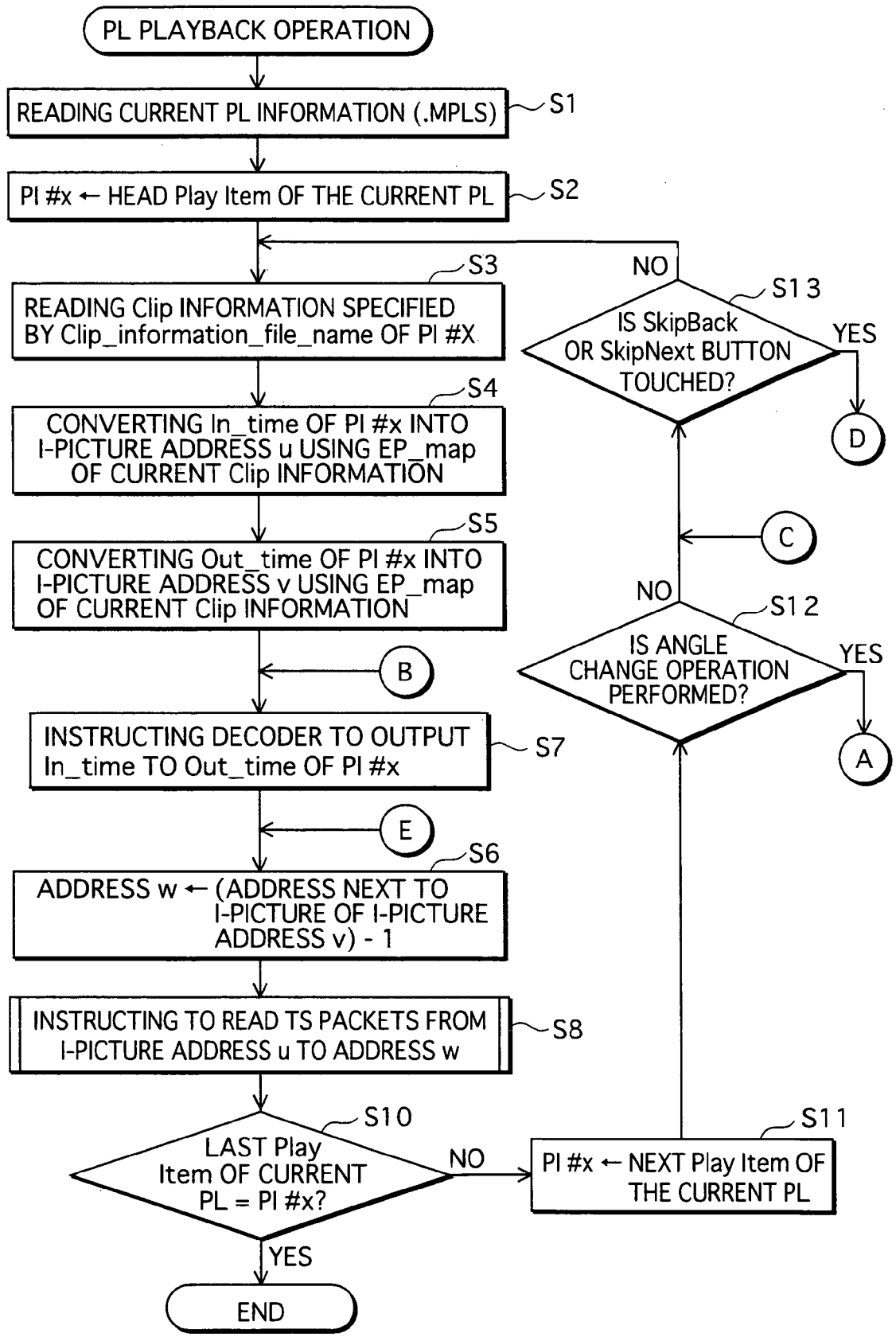
FIG. 22 illustrates a flowchart showing a PL playback operation performed by the playback control unit 15.

FIG. 22 illustrates the flowchart showing a PL playback operation performed by the playback control unit 15. This playback operation includes controlling of the decoder (Step S7) and controlling of the drive device (Step S8).

A Play Item #x is a target Play Item in the operation of this flowchart. In this flowchart, the current PL information (.mpls) is loaded (Step S1), and then the operation from Step S2 to Step S13 is performed. The operation from Step S2 to Step S13 has a loop operation in which Step S3 to Step S8 are repeated for each PI information that structures the current PL information until "Yes" is returned in Step S10. The Play Item to be a target of the loop operation is called the Play Item #x (PI #x). The Play Item #x is initialized by setting as a head Play Item of the current PL (Step S2). The requirement of completion of the above loop operation is that the Play Item #x matches a last Play Item of the current PL (Step S10). If the Play Item #x does not match the last Play Item, a next Play Item of the current PL is set to be the Play Item #x (Step S11).

Step S3 to Step S8 repeated in the loop operation perform the operation of reading the Clip information specified by the Clip_information_file_name of the Play Item #x into the scenario memory 14 (Step S3), converting the In_time of the Play Item #x into the I-picture address u using the EP_map of the current Clip information (Step S4), converting the Out_time of the Play Item #x into the I-picture address v using the EP_map of the current Clip information (Step S5), obtaining a next I-picture of the I-picture address v obtained in the conversion in Step 5, and an address just before the address of the next I-picture is set to be an address w (Step S6), and instructing the drive device to read out the TS packets from the I-picture address u to the address w, using the address w (Step S8).

On the other hand, the decoder is instructed to output from the mark_time_stamp of the current PL Mark to the Out_time of the Play Item #x (Step S7). By performing the above operation from Step S1 to Step S8, a section indicated by the Play Item #x is played back.

Then, whether or not the Play Item #x is the last Play Item of the current PL is judged (Step S10).

If the Play Item #x is not the last Play Item of the current PL, the next Play Item of the current PL is set to the Play Item #x (Step S11), and the operation returns to Step S3 after going through Step S12 and Step S13. By repeating the operation from Step S3 through Step S13, the Play Items forming the PL are sequentially played back.

Figure 23:
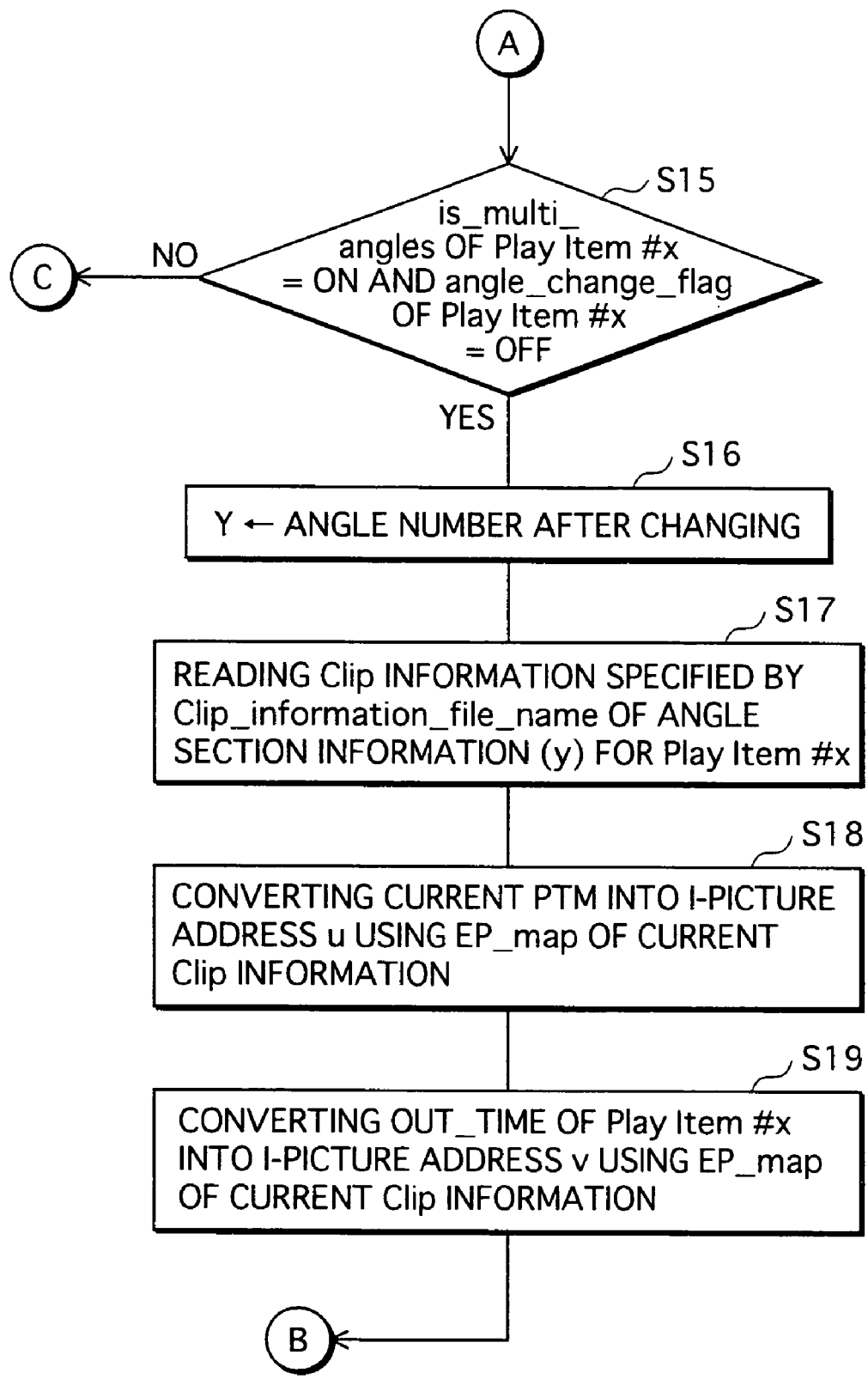
FIG. 23 illustrates a flowchart of an operation of angle change.

Step S12 is for judging whether or not the user has performed the angle change operation. If the judgment is affirmative, the current Clip information is switched. FIG. 23 shows a flowchart of an operation of switching the current Clip information.

Step S15 in FIG. 23 is a judging step for judging whether or not the Play Item #x is both on with the is_multi_angles and off with the angle_change_flag. If the judgment at Step S15 is "No", then the operation moves to Step S13. If the judgment at Step S15 is "Yes", then an operation from Step S16 to Step S19 is performed. Step S16 to Step S19 perform the operation of, assigning an angle number after the changing to a variable x (Step S16), reading the Clip information specified by the Clip_information_file_name of the angle section information (x) in the Play Item into the scenario memory 14 (Step S17), converting the current PTM into the I-picture address u using the EP_map of the current Clip information (Step S18), and converting the Out_time of the Play Item #x into the I-picture address v using the EP_map of the current Clip information (Step S19). As described above, the operation moves to Step S7 after the I-picture addresses u and v are changed. By the operation moving to Step S7, the TS packets from another AV Clip is read, and thus the video content is switched.

Figure 24:
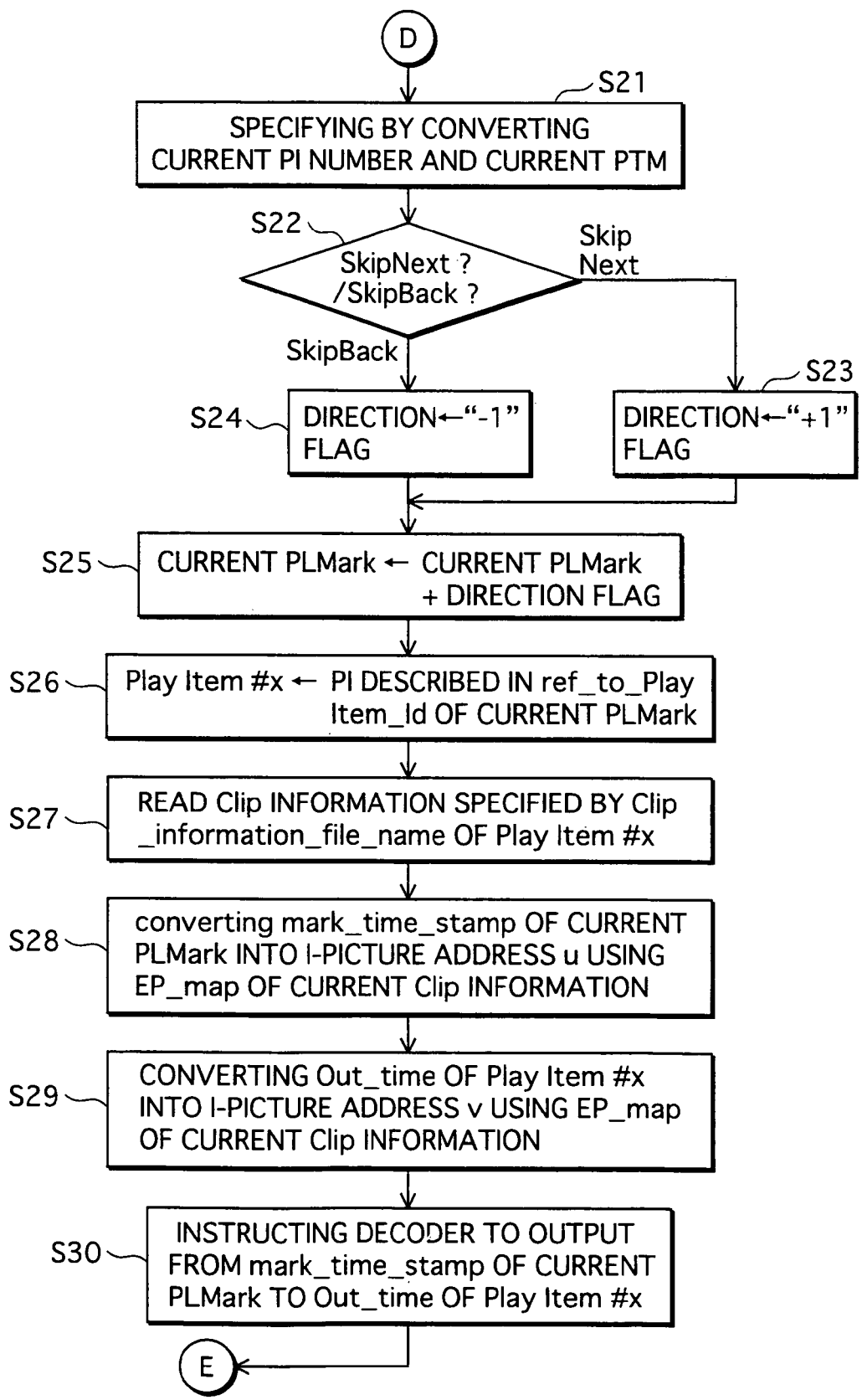
FIG. 24 illustrates a flowchart of an operation performed upon touching a button for SkipBack or SkipNext.

In the meanwhile, Step S13 in FIG. 22 is for judging whether or not the button for the SkipBack or the SkipNext. If the judgment is affirmative, an operation shown in a flowchart of FIG. 24 is performed. The flowchart shown in FIG. 24 shows the operation when the button for the SkipBack or the SkipNext is touched.

In Step S21, current Mark information is obtained by converting a current PI number and a current PTM. Step S22 is for judging whether or not a key that has been pressed is a key for the SkipBack or the SkipNext. If the key is for the SkipBack, a direction flag is set "+1" in Step S23. If the key is for the SkipNext, the direction flag is set "−1" in Step S24.

In Step S25, a number derived by adding the value of the direction flag to the number of the current PL Mark is set as the number of the current PL Mark. The direction flag is "+1" when the key is for the SkipNext, and therefore the current PL Mark is incremented by 1. The direction flag is "−1" when the key is for the SkipBack, and therefore the current PL Mark is decremented by 1.

In Step S26, the PI described in the ref_to_Play Item_Id of the current PL Mark is set as the Play Item #x. In Step S27, the Clip information specified by the Clip_information_file_name of the Play Item #x is loaded. In Step S28, using the EP_map of the current Clip information, the mark_time_stamp of the current PLMark is converted into the I-picture address u. In the meantime, in Step S29, the Out_time of the Play Item #x is converted into the I-picture address v, using the EP_map of the current Clip information. In Step S30, after instructing the decoder to output an output from the mark_time_stamp of the current PL Mark through the Out_time of the Play Item #x, the operation moves to Step S7 in FIG. 22. As described above, the operation moves to Step S7 after changing the I-picture addresses u and v and instructing a playback of another section, and the TS packets from AV Clip is loaded. Thus, the switching of the video contents is realized.

Figure 25:
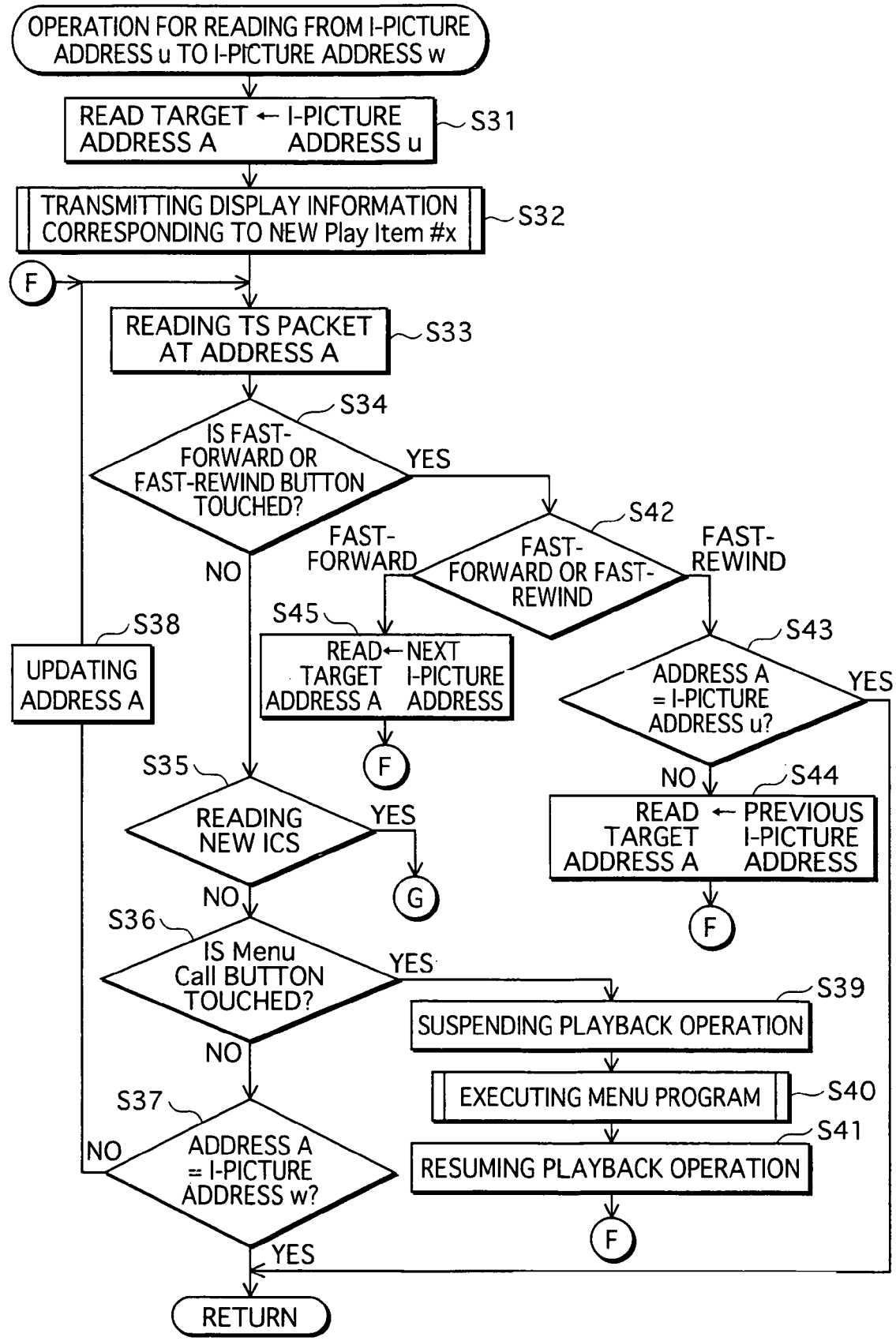
FIG. 25 is a flowchart showing details of Step S8, illustrating procedures for a reading operation of an output from an address u to an address w.

FIG. 25 is a flowchart showing details of Step S8, illustrating procedures for a reading operation of an output from the address u to address w. In this flowchart, the I-picture address u is set as a read target A (Step S31), and a loop operation from Step S33 to Step S45 is performed after transmitting the display information corresponding to a new the Play Item #x.

Figure 26B:
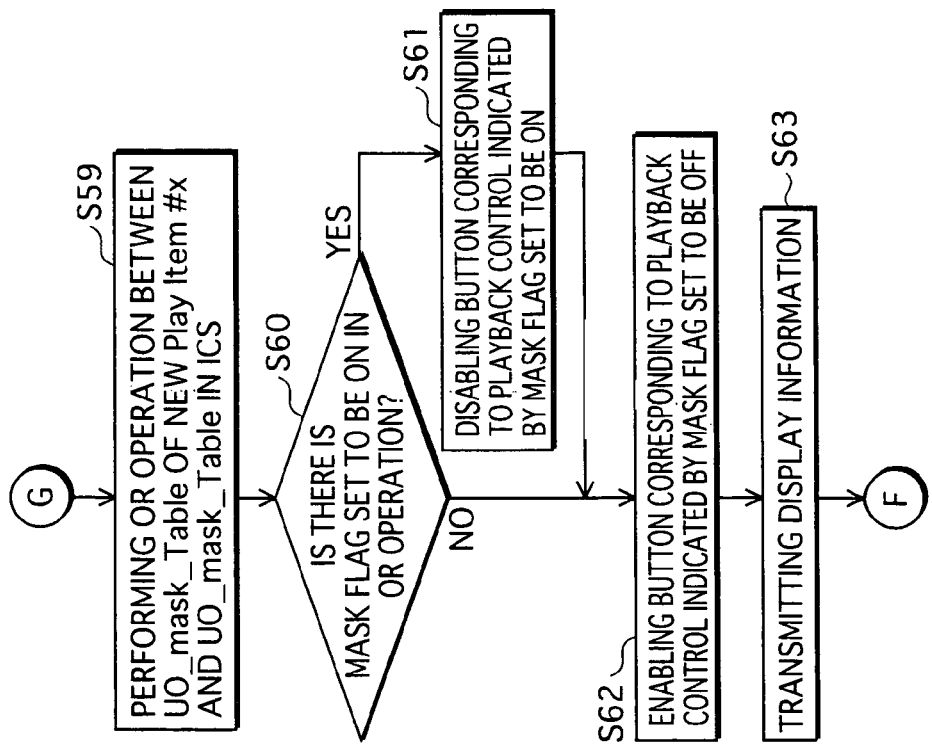
FIG. 26B is a flowchart showing an operation when an ICS is newly loaded.
Figure 26A:
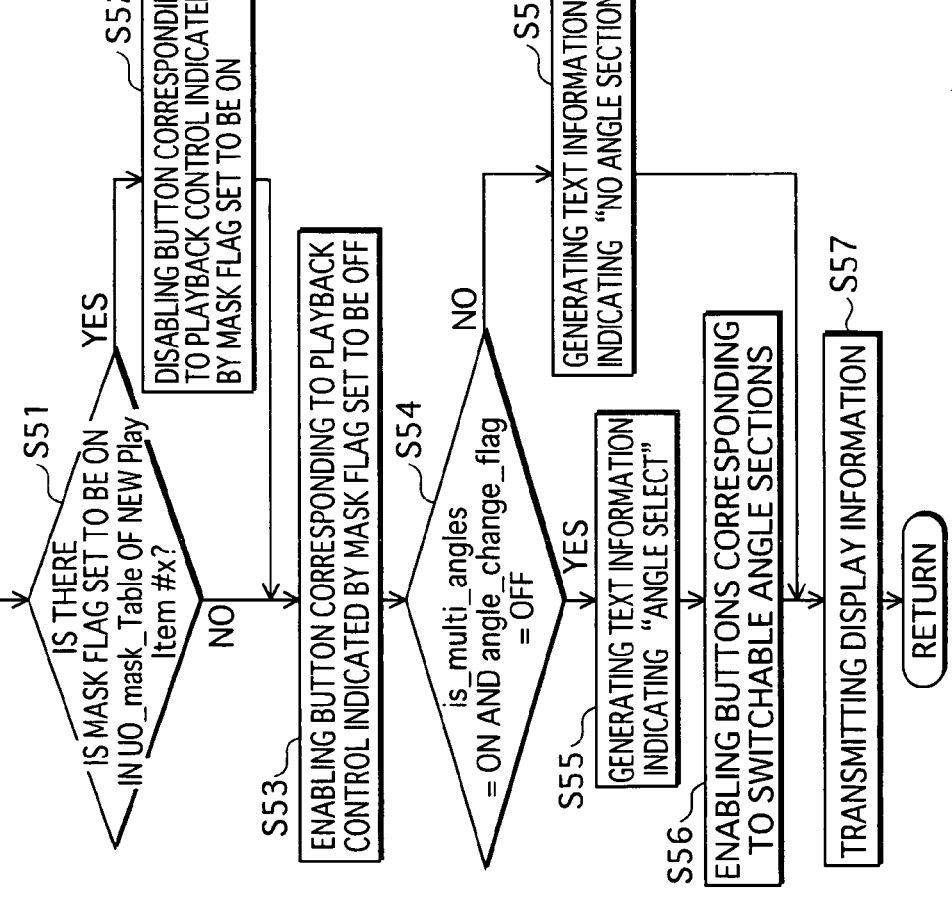
FIG. 26A is a flowchart showing an operation for generating the display information by the display information generating unit 22.

A detail of an operation in Step S32 for transmitting display information is as shown in a flowchart of FIG. 26A. FIG. 26A is the flowchart showing an operation for generating the display information by the display information generating unit 22. In this flowchart, two judging steps of Step S51 and Step S54 are included.

Step S51 is a judging step for judging whether there is a mask flag that is set to be "ON" in the UO_mask_Table of the new Play Item #x. If the judgment is affirmative, a button corresponding to a playback control indicated by the mask flag is disabled (Step S52). The disabling is done by setting the button to a "gray-out" image, and "event" in the button information to be "none".

Then, a button corresponding to a playback control indicated by the mask flag that is set to be "OFF" is enabled (Step S53), and the operation moves to Step S54. The enabling is done by setting the button to a normal image.

Step S54 is a judging step for judging both whether the is_multi_angles of the Play Item #x is "ON", and whether the angle_change_flag is "OFF". If the judgment is negative for the both flags, the text information indicating "no angle section" is generated (Step S58).

If the judgment in Step S54 is affirmative, the text information indicating "angle select" is generated (Step S55), and the button information corresponding to each of angle sections to which the angle change is possible are enabled (Step S56). Then, the display information is transmitted (Step S57). The above is the details of the operation in Step S32 for the transmission of the display information.

The following describes the loop operation from Step S33 to Step S45. This loop operation repeats reading of the TS packets of the address A, and updating of the address A. Step S37 defines completion requirement of this loop operation. Specifically, in Step S37, the loop operation ends when the address A is the I-picture address w.

Step S34 to Step S36 are for monitoring whether there is any user operation when starting to read the TS packets.

Step S36 is a judging step for whether the menu call button displayed on the touch panel remote control 200 is touched. If the judgment is affirmative, the current operation is suspended (Step S39), and a menu program for a menu operation is executed (Step S40). Upon completion of the execution of the menu program, the suspended playback operation is resumed (Step S41). As described above, when the menu is called, the playback operation is suspended, and the operation for displaying the menu is performed.

Step S34 is for judging whether the button for either the fast-forward or the fast-rewind is touched. If the judgment is affirmative, it is judged in Step S42 whether the button touched is for the fast-forward or the fast-rewind. If the touched button is for the fast-forward, then the next I-picture address is set to be the address A that is a read target (Step S45). Setting the address A of the read target to the next I-picture makes it possible to play back the AV Clip every 1 second. By the above structure, the AV Clip can be played back in a forward direction at a double speed, for example.

If the touched button is for the fast-rewind, then whether or no the address A has reached the I-picture address u is judged (Step S43). If not, a previous I-picture address is set as the read target address A (Step S44). Setting the read target address A as the previous I-picture has the AV Clip be played back every 1 second in a backward direction. By the above structure, the AV Clip can be played back in a backward direction, for example, at a double speed. The above describes Step S33 to Step S44.

Step S35 is for judging whether a new ICS is read into the scenario memory 14. If the judging is affirmative, then an operation shown in FIG. 26B is performed.

FIG. 26B is a flowchart showing the operation when the new ICS is read. In Step S59, an OR operation is performed between the UO_mask_Table in a new Play Item #x and the UO_mask_Table in the ICS. Step S60 is for judging whether the mask flag that is set to "ON" is in the result of the OR operation. If the judgment in Step S60 is affirmative, the button corresponding to the mask flag that is set to "ON" is disabled (Step S61). Step S62 is for enabling the button corresponding to the mask flag that is set to "OFF". After enabling the button, the display information is transmitted (Step S63).

As described above, according to the present embodiment, every time when the current playback point reaches a point where the starting point of the Play Item or ICS exits, information indicating the playback controls (such as the angle change, the skip next, the skip back, the fast-rewind, and the fast-forward) to be enabled or disabled is transmitted to the touch panel remote control 200, and appropriate navigators are displayed on the touch panel remote control 200. By checking the information displayed on the touch panel remote control 200 while the user watches and listens to the main body of the digital streams, the user can know what kind of operation is available at the current playback point. Knowing the kinds of operation that are available at the current playback point, the user will not miss a chance when it is possible to instruct such an operation. The information indicating the playback controls to be enabled or disabled is displayed on the touch panel remote control 200 that is separate from a screen to display the playback images of the AV Clip, and thus the information does not interrupt the scenes of the main body of the AV Clip.

Second Embodiment

Figure 27:
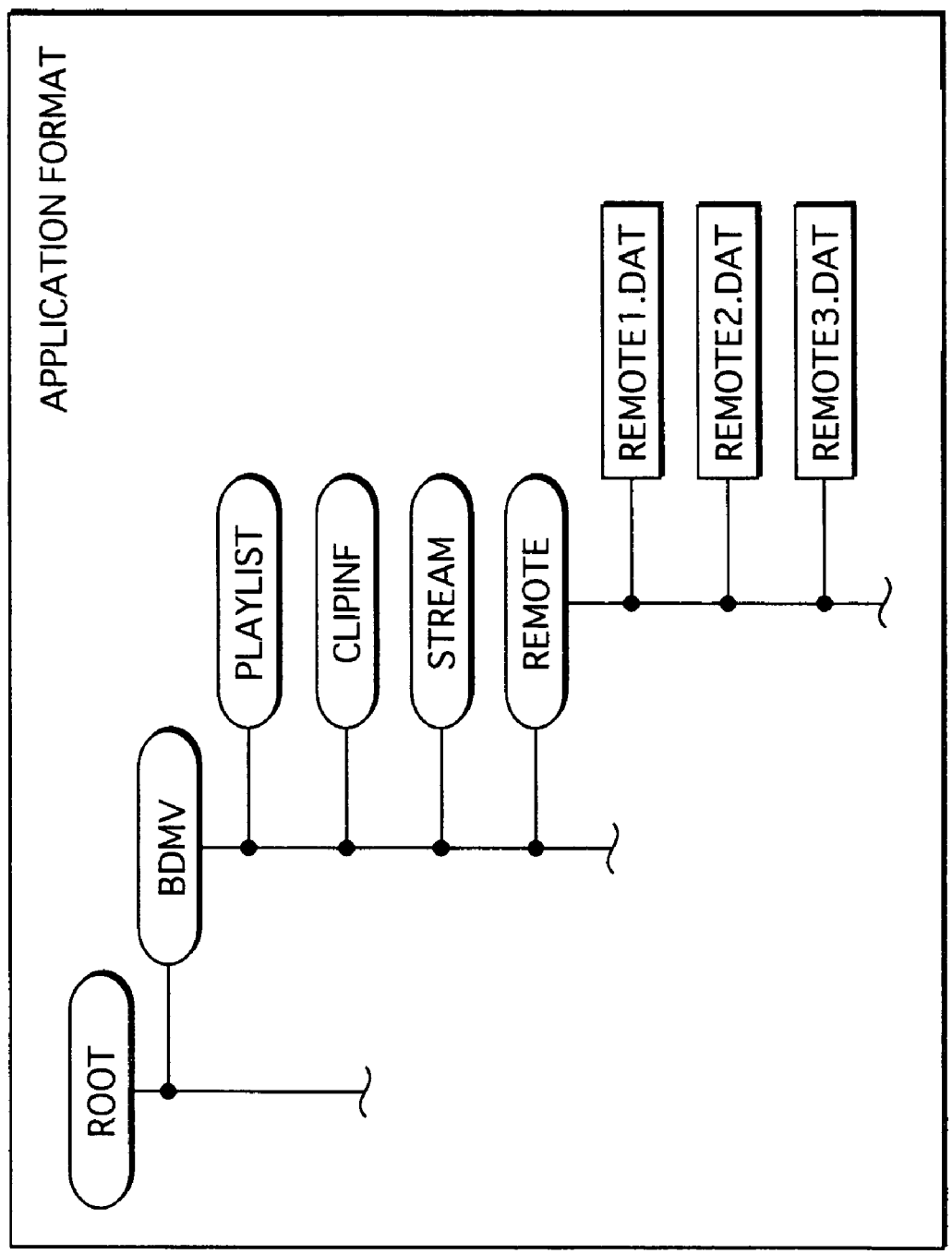
FIG. 27 is a diagram illustrating an application format of the BD-ROM on which the display information is recorded.

In the first embodiment, the display information is automatically generated by the playback apparatus based on the descriptions in the AV Clip and the PL information. A second embodiment, however, relates to an improvement that the display information is generated and recorded on the BD-ROM during authoring. FIG. 27 is a diagram illustrating an application format of the BD-ROM on which the display information is recorded. This diagram is based on the diagram of FIG. 3 for the first embodiment. A difference between the diagrams of FIGS. 27 and 3 is that the diagram of FIG. 27 includes a BDREMOTE directory which is not included in the diagram of FIG. 3. The BDREMOTE directory is a directory for storing the display information, and REMOTE1.DAT, REMOTE2.DAT, REMOTE3.DAT are stored in the BDREMOTE directory. The display information is stored in these files.

FIGS. 28 to 30 illustrate the display information stored in REMOTE1.DAT, REMOTE2.DAT, and REMOTE3.DAT. A difference of the display information according to the second embodiment from that of the first embodiment is that effective period information (effective period="xxx" in the drawing) is described in the second embodiment.

The effective period information indicates a period in which the display information remains effective on a PL playback timeline. In the display information of FIG. 28, for example, the effective period information is shown as "effective period =Play Item #1". This indicates that this display information is effective in the Play Item #1.

In the display information of FIG. 29, the effective period information is shown as "effective period=Play Item #2". This indicates that this display information is effective in the Play Item #2.

Figure 31:
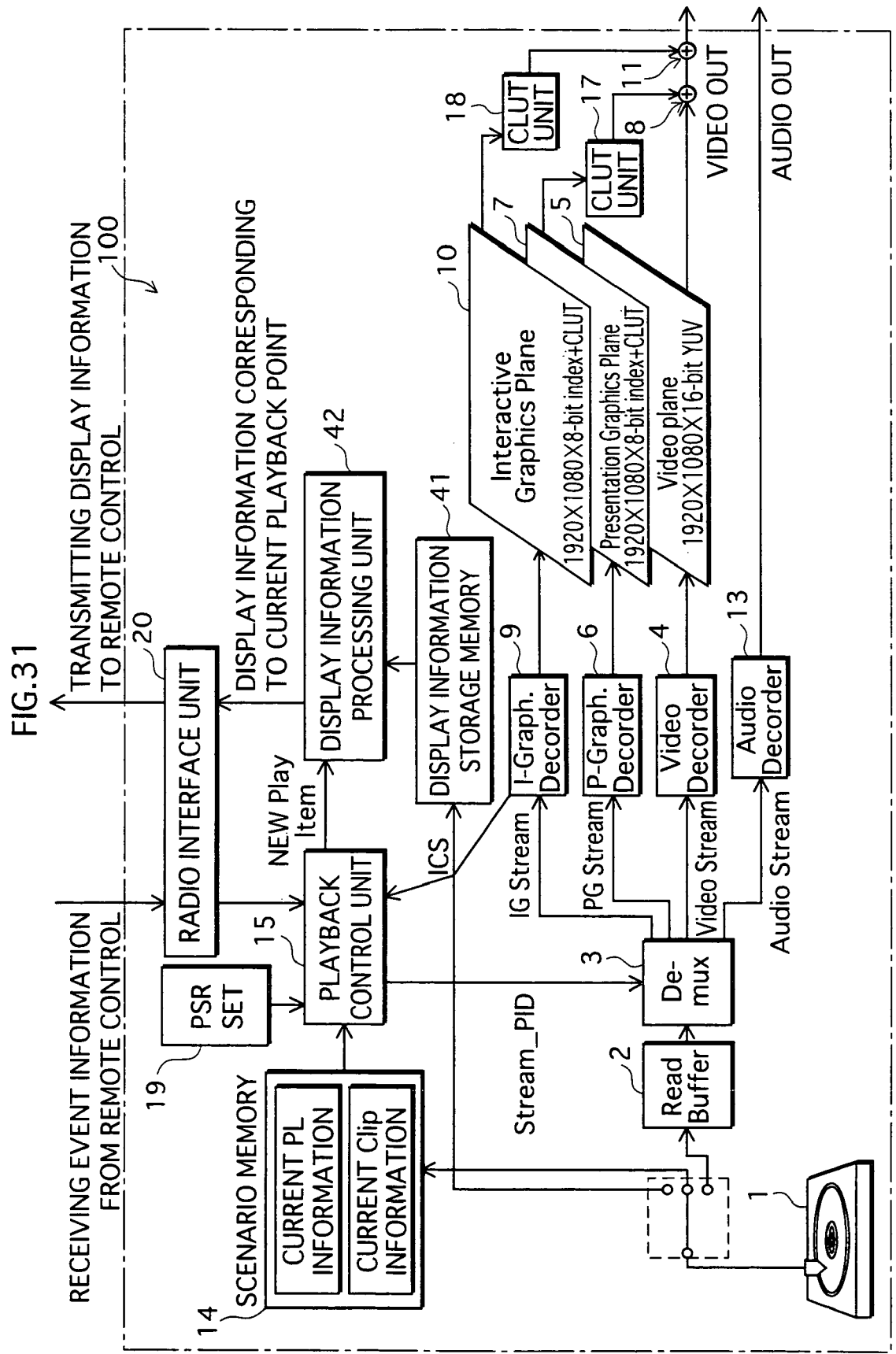
FIG. 31 illustrates an internal structure of the playback apparatus according to a second embodiment.

The above describes the improvement for the BD-ROM according to the present embodiment. The following describes an internal structure of the playback apparatus according to the present embodiment. FIG. 31 illustrates the internal structure of the playback apparatus according to the second embodiment. FIG. 31 is drawn based on FIG. 10 for the first embodiment. A difference between the playback apparatus of FIGS. 31 and 10 is that, in FIG. 31, a display information storage memory 41 and a display information processing unit 42 are provided in the playback apparatus of FIG. 31 instead of the definition information holding unit 21 and the display information generating unit 22. The following describes the display information storage memory 41 and the display information processing unit 42 that are newly provided.

The display information storage memory 41 is a memory to which the display information recorded on the BD-ROM is loaded.

The display information processing unit 42 performs a search, every time when the current playback point reaches a new Play Item, to determine whether a display information whose effective period is in the Play Item exists in the display information storage memory 41. If the display information whose effective period is in the Play Item exists, the display information processing unit 42 hands the display information to the radio interface unit 20 and have the radio interface unit 20 transmit the display information to the touch panel remote control 200.

As has been described, according to the present embodiment, the display information is recorded on the BD-ROM in advance. Therefore, it is possible to display most appropriate navigators for the current playback point on the touch panel remote control 200, without generating the display information on the playback apparatus side.

Third Embodiment

In the first embodiment, the UO_mask_Table is provided to mask the 6 playback controls shown in FIGS. 5 and 9. A third embodiment is to expand the description of the UO_mask_Table. FIG. 32 shows contents of the description of the UO_mask_Table according to the third embodiment.

In FIG. 32, the UO_mask_Table includes a chapter_search_mask flag, a time_search_mask flag, a skip_next_mask flag, a skip_back_mask flag, a play_mask flag, a stop_mask flag, a pause_on_mask flag, a pause_off_mask flag, a still_off_mask flag, a forward_play_mask flag, a backward_play_mask flag, a resume_mask flag, a move_up_selected_button_mask flag, a move_down_selected_button_mask flag, a move_left_selected_button_mask flag, a move_right_selected_button_mask flag, a select_button_mask flag, a activate_button_mask flag, a select_and_activate_button_mask flag, an audio_change_mask flag, a PG_textST_change_mask flag, a angle_change_mask flag, a popup_on_mask flag, a popup_off_mask flag, and a select_menu_language_mask flag.

The chapter_search_mask flag is a flag to define, when a playback control for chapter search is requested by the user, whether the request should be masked or not. The chapter search is the playback control for accepting an input of a number from the user and starting playing back from the chapter specified by the number.

The time_search_mask flag is a flag to define, when a playback control for time search is requested by the user, whether the request should be masked or not. The time search is the playback control for accepting an input of a playback time from the user and starting playing back from the point specified by the playback time.

The skip_next_mask flag and the skip_back_mask flag are flags to define, respectively, whether the requests should be masked or not, when a playback control for the skip next or the skip back is requested by the user.

The play_mask flag is a flag to define, when a playback control for start playing back is requested by the user, whether the request should be masked or not.

The stop_mask flag is a flag to define, when a playback control for stop playing back is requested by the user, whether the request should be masked or not.

The pause_on_mask flag is a flag to define, when a playback control for pause on (temporary stopping) is requested by the user, whether the request should be masked or not.

The pause_off_mask flag is a flag to define, when a playback control for pause off (releasing temporary stopping) is requested by the user, whether the request should be masked or not.

The still_off_mask flag is a flag to define, when a playback control for still image off is requested by the user, whether the request should be masked or not.

The forward_play_mask flag and the backward_play_mask flag are flags to define, respectively, whether the requests should be masked or not, when a playback control for the fast-forward or the fast-rewind are requested by the user as in the first embodiment.

The resume_mask flag is a flag to define, when a playback control for resuming playing back is requested by the user, whether the request should be masked or not.

The move_up_selected_button_mask flag is a flag to define, when a playback control for moving button selection upward is requested by the user operating an interactive display with arrow buttons, whether the request should be masked or not.

The move_down_selected_button_mask flag is a flag to define, when a playback control for moving the button selection downward is requested by the user operating an interactive display with arrow buttons, whether the request should be masked or not.

The move_left_selected_button_mask flag is a flag to define, when a playback control for moving the button selection leftward is requested by the user operating an interactive display with arrow buttons, whether the request should be masked or not.

The move_right_selected_button_mask flag is a flag to define, when a playback control for moving the button selection rightward is requested by the user operating an interactive display with arrow buttons, whether the request should be masked or not.

The select_button_mask flag is a flag to define, when a playback control for the button selection is requested by the user operating an interactive display with more than one buttons, whether the request should be masked or not.

The activate_button_mask flag is a flag to define, when a playback control for confirmation of the selection of the button is requested by the user operating an interactive display with more than one buttons, whether the request should be masked or not.

The select_and_activate_button_mask flag is a flag to define, when a playback control for selection of the button and confirmation of the selection is requested by the user operating an interactive display with more than one buttons, whether the request should be masked or not.

The audio_change_mask flag is a flag to define, when a playback control for audio change is requested by the user, whether the request should be masked or not.

The PG_textST_change_mask flag is a flag to define, when a playback control for switching between the subtitles rendered as the graphics (Presentation Graphics) and the subtitles in text is requested by the user, whether the request should be masked or not.

The angle_change_mask flag is a flag to define, when a playback control for changing the angle is requested by the user, as in the first embodiment, whether the request should be masked or not.

The popup_on_mask flag is a flag to define, when a playback control for calling for the popup menu is requested by the user, as in the first embodiment, whether the request should be masked or not.

The popup_off_mask flag is a flag to define, when a playback control for turning off the display of the popup menu is requested by the user, as in the first embodiment, whether the request should be masked or not.

The select_menu_language_mask flag is a flag to define, when a playback control for selecting a description language for the menu is requested by the user, as in the first embodiment, whether the request should be masked or not.

The above described masks for the playback controls are defined in the UO_mask_Table, and therefore the display information generating unit 22 according to the third embodiment generates the display information for displaying the playback controls masked in the UO_mask_Table in gray-out images and the playback controls not masked in the UO_mask_Table in the normal images. The display information generated in the above way is transmitted to the touch panel remote control 200, and thereby more detailed display of the navigators is realized.

Fourth Embodiment

The playback apparatus according to a fourth embodiment includes a download unit for downloading the display information.

The download unit downloads the display information by accessing a server apparatus. Then, the downloaded display information is transmitted to the radio interface unit 20, and displayed in the chapter of the touch panel remote control 200. In downloading, the download unit specifies the display information to be downloaded in one of the following manners.

A first method is realized by describing an URL in the BD-ROM. The URL is clearly specifies a website from which the display information corresponding to the BD-ROM is downloaded. Based on this URL, the download unit accesses the website to download the display information.

A second method is realized by utilizing a database, a search server, and an identification information. The database stores more than one pieces of the display information. The download unit accesses the search server, and hands the identification information managed by the BD-ROM to the search server. Receiving the identification information, the server searches the database using the identification information, and obtains a piece of the display information that matches the identification information. Then, the server transmits the display information to the playback apparatus, based on the result of the search.

A third method is realized by utilizing a database, the search server, and a user profile. As the database in the second method, this database stores more than one pieces of the display information. The user profile is information representing the user's preference, which is indicated by a statistic score for each genre of the contents. Representing the user's preference by statistic scores can be realized by an operation history function of the playback apparatus with which, every time the user instruct to play back a content, the playback apparatus obtains a genre to which the content belongs to, and increments a value as the statistic score of the genre.

Because such a user profile is generated by the playback apparatus, the download unit accesses the search server and hands the user profile to the search server. Receiving the user profile, the search server extracts a piece of the display information that matches the user profile out of the pieces of the display information in the database. Then, the server apparatus transmits the extracted display information to the playback apparatus.

[Remarks]

The above descriptions by no means show the implementation of all configurations of the present invention. Implementation of the present invention is still possible according to implementation of configurations that carry out the following modifications (A) to (G). The inventions pertaining to the claims of the present application range from expanded disclosure to generalized disclosure of the plurality of embodiments disclosed above and the modified configurations thereof. The degree of expansion or generalization is based on the particular characteristics of technical standards in the technical field of the present invention at the time of the application.

(A) In each of the embodiments, the playback controls that are disabled are shown in the gray-out images. This is to clearly inform the user that these playback controls are "disabled". In order to inform the user only of the enabled playback controls, it is preferable to generate the display information indicating only buttons for the enabled playback controls and transmits the generated display information to the touch panel remote control 200.

(B) In the fourth embodiment, a general-purpose CPU having a two-way interface with the playback apparatus may be utilized as the touch panel remote control 200. An example of devices that can be utilized as a general-purpose terminal is a mobile telephone having an infrared transceiving function. When such a general-purpose terminal is provided as the touch panel remote control 200, it is possible to have the mobile telephone perform the downloading using a communication facility equipped in the mobile telephone. The URL for the download website from which the mobile telephone perform the download is printed on the BD-ROM package. Upon downloading the display information at the website after the user manually inputting the URL, the operation is performed based on the downloaded display information.

Further, a two-dimensional barcode indicating an URL for a specific website may be printed on the BD-ROM package. Upon downloading the display information at the website after having the mobile telephone reading the two-dimensional bar code, the operation is performed based on the downloaded display information.

Moreover, it is also possible to display a character that appears in the contents to be played back in the navigators.

(C) In the fourth embodiment, the download of the display information is done in amass download. However, the downloading may be done in a split download.

The display information does not necessarily have to be transmitted every time a new ICS is loaded. The display information may be transmitted once in multiple times of loading the ICS, such as every other time, or every three times. It is also possible to transmit the display information only when the content of the display information has changed.

In addition, it is possible to display an angle recommended to switch when the display information informs the user that the angle change is enabled.

(D) In the above embodiments, the navigators are displayed in the touch panel remote control 200. However, the navigators are not necessarily displayed in a touch panel. Specifically, it is also possible to display the navigators in a conventional liquid crystal display equipped in a conventional remote controller. Further, the navigators may be displayed in an operation panel, instead of a remote controller, because it is possible to display the navigators in such an operation panel without disturbing the main body of the movie work.

(E) The BD-ROM may be recorded with a MOVIE object that is a dynamic scenario. The MOVIE object (zzz.movie) is a dynamic scenario described in commands similar to commands for the DVD player, and includes a playback command to instruct playback of the PL, a pre-command to be executed prior to the playback, and a post-command to be executed following the playback. A group of more than one dynamic scenario and PLs to be played back in respective scenarios is called a "title". The title is a unit corresponding to one movie work recorded in the BD-ROM.

The MOVIE object includes attribute information and a sequence of commands. The attribute information includes menu_call_mask and Title_search_mask.

The menu_call_mask is a flag indicating whether the menu call is masked or not. If this flag is off, then the user request for the menu call is allowed. If this flag is on, then the user request for the menu call is prohibited.

The Title_search_mask is a flag indicating whether the title search is masked or not. If this flag is off, then the user request for the title search is allowed. If this flag is on, then the user request for the title search is prohibited.

Whether the playback controls are enabled or disabled may be determined according to the menu call mask and the Title search_mask as described above in addition to the UO_mask_Table.

(F) Although the digital stream in the above embodiments is the AV Clip of the BD-ROM standard, a video object (VOB) of the DVD-Video standard may also be used. The VOB is a program stream obtained by multiplexing a video stream and an audio stream, and is compliant to ISO/IEC13818-1 standard.

In the first embodiment, a table that indicates whether the playback controls should be masked (UO_mask_Table) is provided in the ICS multiplexed in the AV Clip. In VOB, such a table may be defined in a table of a User Operation Permission (UOP) in a NAVI-pack of the VOB.

Further, the video stream in the AV Clip may be in an MPEG4 standard or a WMV standard. In addition, the audio steam may be in a Linear-PCM standard, a Dolby-AC3 standard, an MP3 standard, an MPEG-AAC standard, or a dts standard.

(G) In the above embodiments, the information specifying the order the contents to be played back is the Play List in the BD-ROM standard. However, this information may be PGC information in the DVD-Video standard. Moreover, although the information for the playback section in the above embodiments is the Play Item information in the BD-ROM standard, this information may also be Cell information in the DVD-Video standard. Whether or not to mask the playback controls may be defined in the UOP table in the PGC information.

INDUSTRIAL APPLICABILITY

The internal structure of the playback apparatus according to the present invention is disclosed in the above embodiments. Accordingly, it is possible to mass produce the playback apparatus according to the present invention based on the disclosed internal structure, and thus it is possible to industrially utilize the playback apparatus. Therefore, the playback apparatus according to the present invention is industrially applicable.

The invention claimed is:

1. A playback apparatus comprising:
a playback unit operable to play back a digital stream recorded on a recording medium to enable a playback image on a display screen;
a judging unit operable to judge whether there is a playback control that becomes enabled or disabled, when a current playback point in a playback timeline of the digital stream reaches a predetermined point; and
a transmission unit operable to, when the playback control is available, transmit information relating to the playback control to a user control operation device for controlling the playback apparatus,
wherein the operation device includes a display unit,
wherein the transmission unit causes the operation device to use the transmitted information to display information about whether the playback control is enabled or disabled is displayed on the display unit.

2. A playback apparatus according to claim 1, wherein the transmitted information is composite display information for composing an interactive display in which a plurality of buttons are arranged,
each of the buttons corresponds to a different one of a plurality of playback controls, and
whether each of the playback controls is enabled or disabled is represented by setting a button corresponding to an enabled playback control to an available state, and setting a button corresponding to a disabled playback control to an unavailable state.

3. A playback apparatus according to claim 2, wherein the composite display information includes pieces of event information each corresponding to a different one of the buttons, and
each piece of event information indicates an event to be outputted from the operation device upon an operation of the corresponding button by a user.

4. A playback apparatus according to claim 2, further comprising:
a memory that holds pieces of the composite display information in advance, wherein
each piece of the composite display information includes a piece of effective section information specifying an effective playback section during which the interactive display is effective, the effective playback section being one of a plurality of playback sections in the digital stream,
the predetermined point is at a head of one of the playback sections, and
the judging is performed by searching the memory for a piece of effective section information indicating the playback section in which the predetermined point is located.

5. A playback apparatus according to claim 2, wherein the composite display information is either
(i) read from the recording medium, upon loading of the recording medium, into a memory provided in the playback apparatus, or
(ii) downloaded from a server apparatus on a network to the memory.

6. A playback apparatus according to claim 1, wherein the recording medium is recorded with pieces of playback section information each specifying a different one of a plurality of playback sections,
each piece of playback section information includes a flag indicating whether a playback control is enabled or disabled in the corresponding playback section,
the predetermined point is at a head of one of the playback sections, and
the judging is performed by referring to the flag in a piece of playback section information corresponding to the playback section in which the predetermined point is located.

7. A playback apparatus according to claim 6, wherein the playback control is angle change,
the flag indicates whether a request for the angle change is masked,
the each piece of playback section information further includes another flag indicating whether the corresponding playback section is multi-angle, and the judging is performed by taking a logical sum of the two flags.

8. A playback apparatus according to claim 6, wherein the playback control is skip play,
the flag indicates whether a request for the skip play is masked.

9. A playback apparatus according to claim 6, wherein the playback control is one of fast-forward and fast-rewind, the flag indicates whether a request for the one of fast-forward and fast-rewind is masked.

10. A playback apparatus according to claim 1, wherein the predetermined point is a point where an interactive control segment exists in the digital stream,
the judgment is performed by taking a logical sum of a flag in the interactive control segment corresponding to the current playback point and a flag in a piece of playback section information that has been read into the playback apparatus.

11. A system integrated circuit mountable in a playback apparatus that plays back a digital stream recorded on a recording medium, the system integrated circuit comprising:
a judging unit operable to judge whether there is a playback control that becomes enabled or disabled, when a current playback point of the digital stream reaches a predetermined point in a playback timeline; and
a transmission unit operable to, when the playback control is available, transmit information relating to the playback control to a user control operation device,
wherein the operation devices includes a display unit,
wherein the transmission unit causes the operation device to display information about whether the playback control is enabled or disabled is displayed on the display unit.

12. A non-transitory recording medium on which a program is recorded, the program causing a computer to perform a playback operation, comprising steps of:
playing back a digital stream recorded on a recording medium;
judging whether there is a playback control that becomes enabled or disabled, when a current playback point of the digital stream reaches a predetermined point in a playback timeline; and
when the playback control is available, transmitting information relating to the playback control to a user control operation device,
and then displaying information about whether the playback control is enabled or disabled on a display unit included in the operation device.

13. A playback method comprising steps of:
playing back a digital stream recorded on a recording medium by a playback apparatus;
judging by the playback apparatus whether there is a playback control that becomes enabled or disabled, when a current playback point of the digital stream reaches a predetermined point in a playback timeline; and
when the playback control is available, transmitting information relating to the playback control from the playback apparatus to a user control operation device, and then displaying information about whether the playback control is enabled or disabled on a display unit included in the operation device.

* * * * *